(12) United States Patent
Rabas et al.

(10) Patent No.: US 6,837,234 B2
(45) Date of Patent: Jan. 4, 2005

(54) OVEN HEAT EXCHANGER AND FLOOR CONSTRUCTION

(75) Inventors: Jiri Rabas, Federal Way, WA (US); Hans Paller, Maple Valley, WA (US)

(73) Assignee: Premark FEG L.L.C., Wilmington, DE (US)

( * ) Notice: Subject to any disclaimer, the term of this patent is extended or adjusted under 35 U.S.C. 154(b) by 0 days.

(21) Appl. No.: 10/423,070

(22) Filed: Apr. 25, 2003

(65) Prior Publication Data

US 2003/0205222 A1 Nov. 6, 2003

(Under 37 CFR 1.47)

Related U.S. Application Data

(60) Provisional application No. 60/377,728, filed on May 3, 2002.

(51) Int. Cl.[7] .............................. A21B 1/08; F24C 1/00
(52) U.S. Cl. .................................. 126/21 A; 126/21 R
(58) Field of Search ........................... 126/21 A, 21 R

(56) References Cited

U.S. PATENT DOCUMENTS

| | | |
|---|---|---|
| 1,536,427 A | 5/1925 | Degner |
| 1,852,526 A | 4/1932 | Kemp |
| 1,857,447 A | 5/1932 | Engels |
| 1,878,519 A | 9/1932 | Hoppe |
| 2,351,487 A | 6/1944 | Cooney |
| 2,384,390 A | 9/1945 | Nalbach et al. |
| 2,767,667 A | 10/1956 | Spooner |
| 3,148,674 A | 9/1964 | Boardman et al. |
| 3,537,405 A | 11/1970 | Verhoeven |
| 3,905,760 A | 9/1975 | Johansson et al. |
| 3,926,106 A | 12/1975 | Deusing et al. |
| 3,954,053 A | 5/1976 | Johansson et al. |
| 4,029,463 A | 6/1977 | Johansson et al. |
| 4,202,259 A | 5/1980 | Johansson |
| 4,357,522 A | 11/1982 | Husslein et al. |
| 4,381,442 A | 4/1983 | Guibert |
| 4,492,216 A | 1/1985 | Dumont |
| 4,515,143 A * | 5/1985 | Jabas ..................... 126/21 A |
| 4,627,409 A | 12/1986 | Kagomoto |
| 4,648,377 A | 3/1987 | Van Camp |
| 4,779,604 A | 10/1988 | König |
| 4,782,214 A | 11/1988 | Voegtlin |
| 4,813,398 A | 3/1989 | Savage |
| 4,823,766 A | 4/1989 | Violi |
| 4,869,155 A | 9/1989 | Grieve |
| 4,909,236 A | 3/1990 | Del Fabbro |
| 4,975,047 A | 12/1990 | Mitsuhashi et al. |
| 5,014,679 A | 5/1991 | Childs et al. |
| 5,129,384 A * | 7/1992 | Parks ..................... 126/21 A |
| 5,394,791 A | 3/1995 | Vallee |
| 5,429,112 A | 7/1995 | Rozzi |
| 5,441,405 A | 8/1995 | Bedford et al. |
| 5,556,566 A | 9/1996 | Cappello et al. |
| 5,615,603 A | 4/1997 | Polin |
| 5,617,839 A * | 4/1997 | Jennings et al. ............ 126/20 |
| 5,717,192 A | 2/1998 | Dobie et al. |
| 5,814,789 A | 9/1998 | O'Leary et al. |
| 5,845,631 A * | 12/1998 | Kleva et al. ............ 126/21 A |
| 6,021,709 A | 2/2000 | Koopman et al. |
| 6,121,582 A | 9/2000 | Dollinger et al. |
| 6,557,543 B2 * | 5/2003 | Cole et al. ............. 126/21 A |

* cited by examiner

Primary Examiner—Alfred Basichas
(74) Attorney, Agent, or Firm—Thompson Hine LLP

(57) ABSTRACT

An oven construction includes a heat exchanger with substantially vertically arrange heat exchange tubes and an anchor-free and adjustable floor construction for the baking chamber.

42 Claims, 19 Drawing Sheets

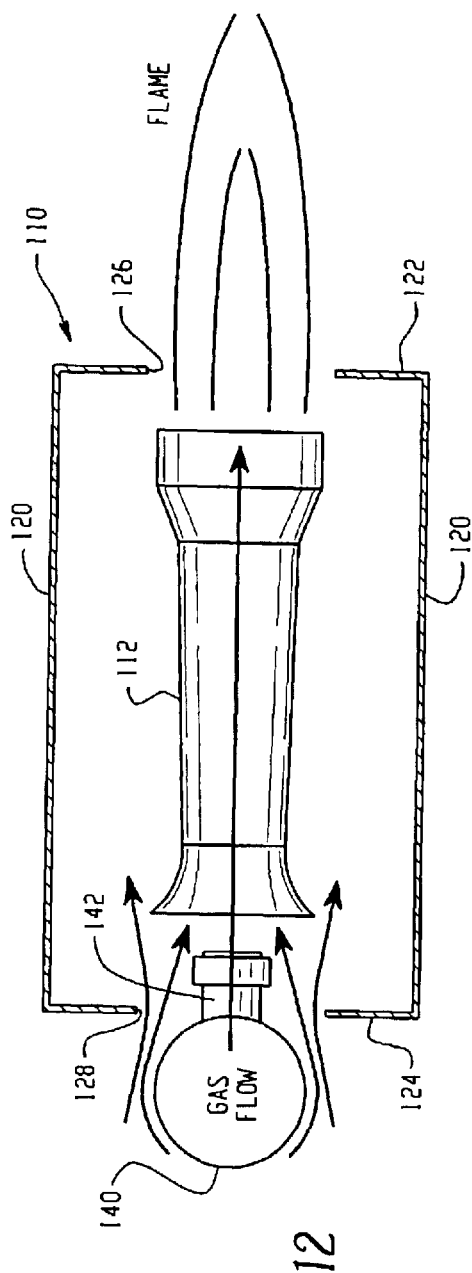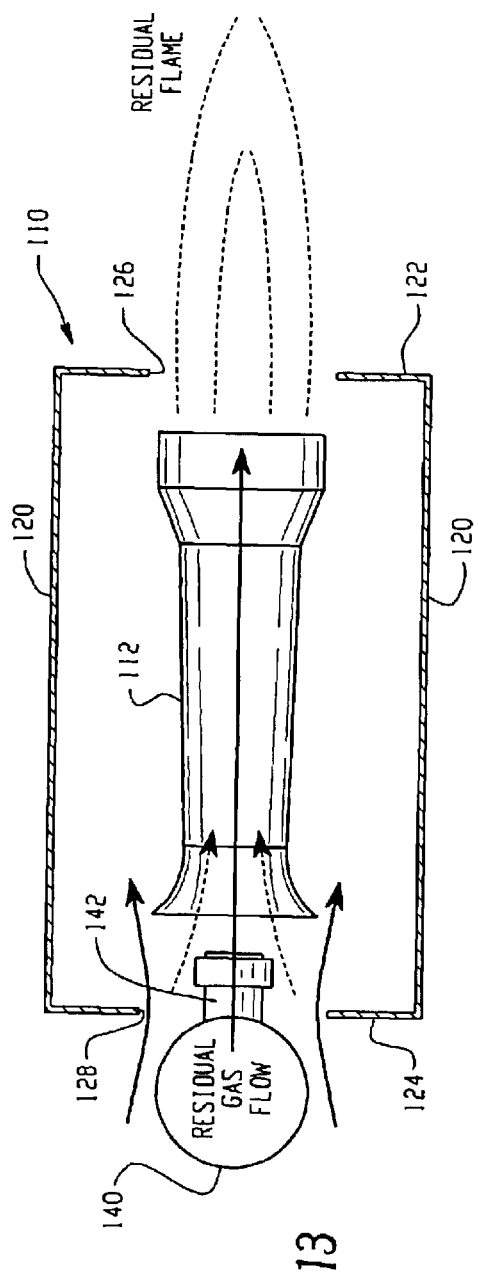

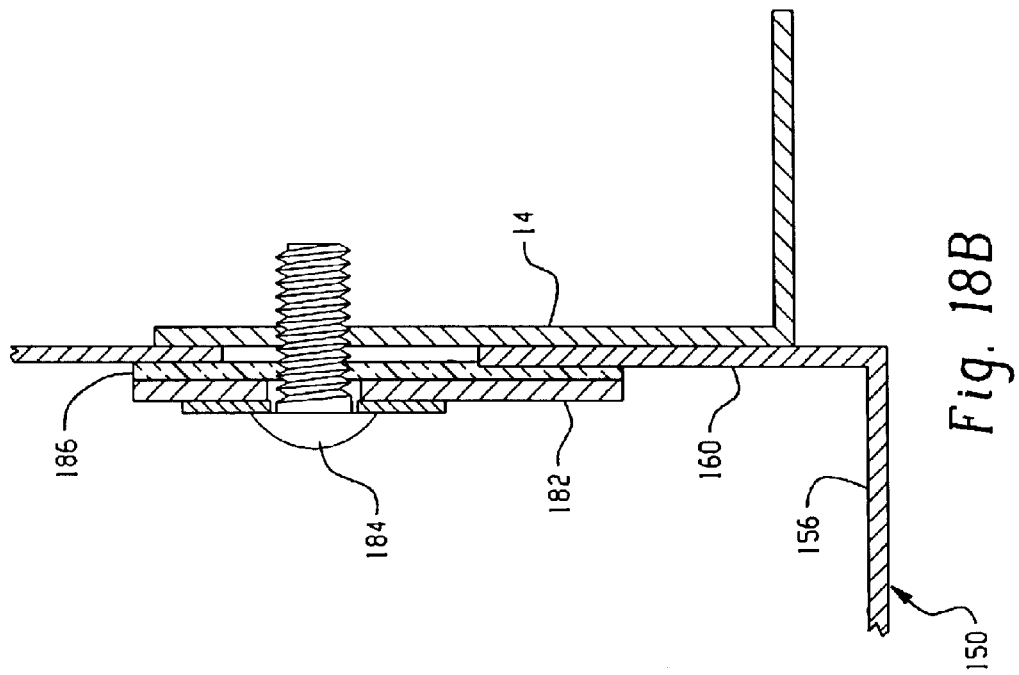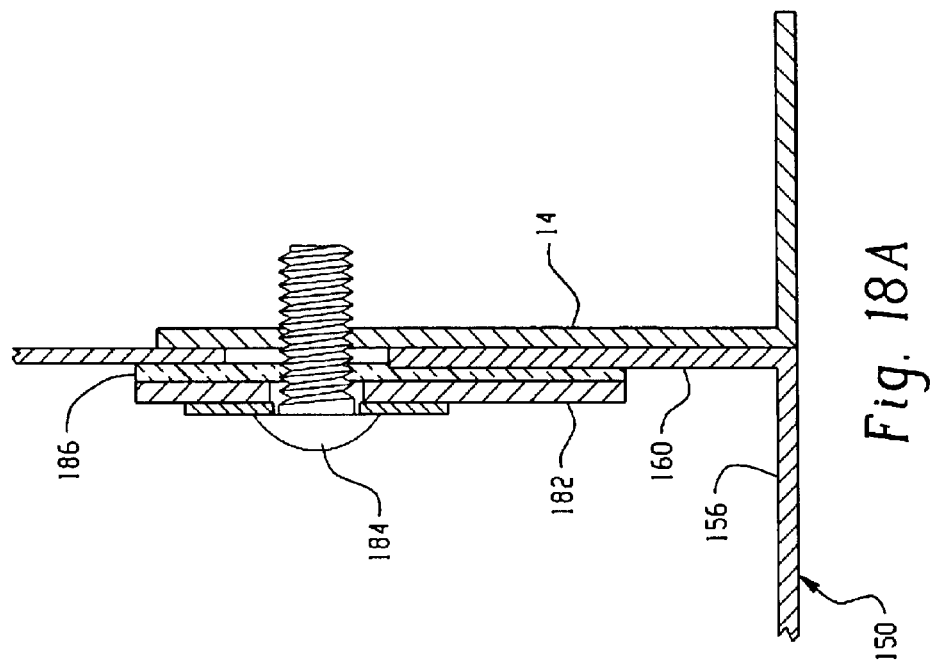

MATERIAL EXPANSION   MATERIAL EXPANSION

HORIZONTAL GAP

MATERIAL EXPANSION   MATERIAL EXPANSION

HORIZONTAL GAP CLOSES

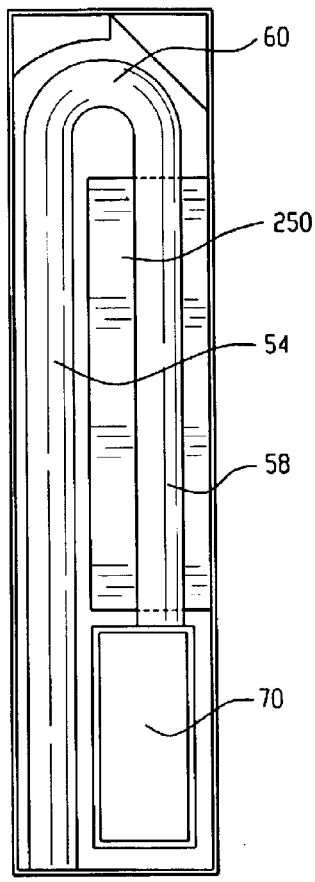
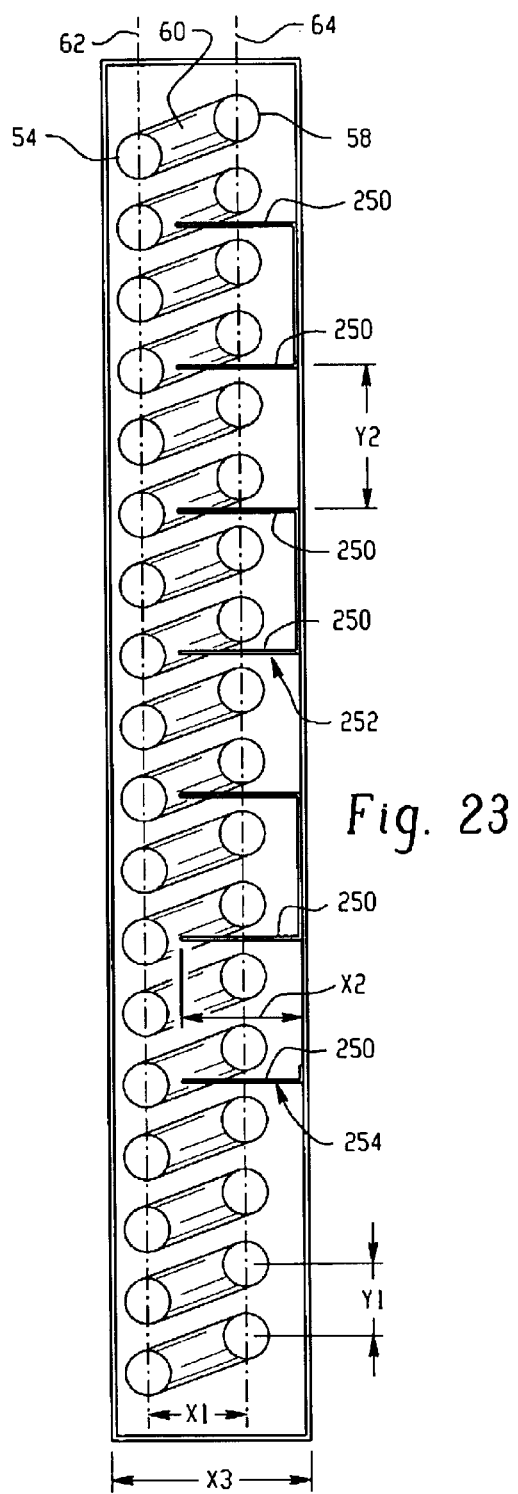
Fig. 22
Fig. 23

US 6,837,234 B2

OVEN HEAT EXCHANGER AND FLOOR CONSTRUCTION

CROSS-REFERENCE

This application claims the benefit of U.S. provisional application Ser. No. 60/377,728, filed May 3, 2002.

TECHINICAL FIELD

The present invention relates generally to convection ovens used for baking items such as bread and, more particularly, to a heat exchanger construction and a baking chamber floor construction for a convection oven such as a rack oven.

BACKGROUND

Rack ovens are generally equipped with a fuel-fed heating element and a fan for moving heated air throughout a baking chamber to provide a rapid distribution of hot air over the food product. Commercial ovens of this type include a baking chamber, which is sized to receive a rack having multiple shelves containing products to be baked; a power driven, rotating mechanism to rotate the product as it is being cooked or baked; a heat exchanger including one or more gas burners and an exhaust system to eliminate combustion gases; and a circulating system for directing hot air along a heated air flow path that passes through the baking chamber. Conventional rack ovens of the type for baking bread also generally include a steam generator for the introduction of steam into the oven for brief periods of time, usually at the beginning of the baking process, to impart a desired color and crispness to the crust of the bread.

In convection ovens such as that described in U.S. Pat. No. 5,617,839, a rack oven includes a heat exchanger comprising a plurality of heat exchange tubes, and a plurality of gas fired in-shot burners, wherein each of the in-shot burners fires into a corresponding heat exchange tube. One or more blowers circulate air past the heat exchange tubes and to the oven baking chamber. The input openings of the plurality of heat exchange tubes are arranged in a plurality of horizontal rows, each row containing a plurality of input openings, the rows spaced vertically from each other. Each tube then extends across an air flow region into a vertical gas collection duct, with corresponding tubes then extending back across the air flow region to another gas collection duct and so on. It is also known to eliminate the gas collection ducts by simply providing heat exchange tubes having appropriate bends. These arrangements present a relatively large lateral footprint for the heat exchanger, which impacts the necessary width for the overall oven.

In-shot burner type heat exchangers can also exhibit a phenomenon called "candling" when the gas supply to the manifold is initially turned off. Candling is defined as residual gas burning at the gas manifold orifices.

FIGS. 24A, 24B and 24C illustrate another PRIOR ART rack oven construction 300 in which a heat exchanger section 302 is positioned alongside the baking chamber 304. The wall 306 separating the baking chamber 304 from the heat exchanger section 302 includes a single, centrally disposed opening 308 having an axial fan 309 positioned therein. The wall 306 also includes louvers 310 towards the sides thereof The heat exchanger section 302 includes a plurality of horizontally extending, U-shaped exchange tubes 312, with tube segments 320 and 322, are arranged vertically one above the other. When the fan 309 is rotated, air flows from the baking chamber 304, through the opening 308 onto a central section of the heat exchange tubes and then splits in two lateral directions along the heat exchange tubes to be returned to the baking chamber via louvers 310 as best seen by the arrows in FIG. 24A. As best reflected in FIG. 24B, there is also a substantial vertical (upward and downward) component to the air flow in the heat exchanger section 302 due the central location of the opening 308. Likewise, there would be a significant vertical component to the air flow in the baking chamber 304 as well. A steam generator (not shown) is also provided in the prior art oven 300. As best seen in FIG. 24C, the U-shaped heat exchange tubes 312 are arranged at progressively increasing angles to the horizontal when moving away (either upward or downward) from a vertically central location 324 of the tubes.

Typical rack ovens also commonly include baking chamber floor constructions that include a non-insulated single floor panel that is anchored to the floor on which the oven sits and/or is rigidly, non-adjustably connected to the side walls of the oven. Because rack ovens should be level upon installation and site floors are not always level, anchoring the baking chamber floor to the site floor and/or rigidly fixing the baking chamber floor to the oven side walls does not facilitate movement of the oven from one location to another. Further, anchored floors may experience buckling due to thermal expansion. This floor construction can also be used on non-gas burning versions of ovens, such as electric versions.

SUMMARY

In one aspect, in a convection oven including a baking chamber, a door providing access to the baking chamber, and a blower for circulating hot air along a heated air flow path that passes through the baking chamber, a heat exchanger includes a plurality of heat exchange tubes extending across a portion of the heated air flow path outside the baking chamber. Each heat exchange tube includes an input end associated with a first linear segment, an output end associated with a second linear segment and a bend connecting the first linear segment to the second linear segment such that the second linear segment extends substantially parallel to the first linear segment. The plurality of heat exchange tubes are arranged vertically to align the first linear segments in a first substantially vertical plane and to align the second linear segments in a second substantially vertical plane, where the first substantially vertical plane is offset laterally from the second substantially vertical plane. A plurality of gas burners, each burner associated with a respective input end of a respective heat exchange tube for delivering combustion gases through the respective heat exchange tube.

In another aspect, in a convection oven including a baking chamber, a door providing access to the baking chamber, and a blower for circulating hot air along a heated air flow path that passes through the baking chamber, a heat exchanger includes a plurality of heat exchange tubes extending across a portion of the heated air flow path outside the baking chamber. The heat exchange tubes are arranged to form first and second spaced apart vertical tube arrays, the tubes of the first tube array having respective axes that lie in a first substantially vertical plane and the tubes of the second tube array having respective axes that lie in a second substantially vertical plane. The spaced apart first and second vertical tube arrays define a substantially vertical air flow path therebetween. A baffle system is associated with the plurality of heat exchange tubes.

In a further aspect, in a convection oven including a baking chamber, a door providing access to the baking chamber, and a blower for circulating hot air along a heated air flow path that passes through the baking chamber, a heat exchanger includes at least first and second modular tube assemblies. Each modular tube assembly includes a plurality of heat exchange tubes, each heat exchange tube including an input end associated with a first linear segment, an output end associated with a second linear segment and a bend connecting the first linear segment to the second linear segment, with the plurality of heat exchange tubes arranged vertically to align the first linear segments in a first plane and to align the second linear segments in a second plane, where the first plane is offset laterally from the second plane. The first modular tube assembly is stacked atop the second modular tube assembly to align the first plane of the first modular tube assembly with the first plane of the second assembly and to align the second plane of the first modular tube assembly with the second plane of the second modular tube assembly.

In yet another aspect, in a convection oven including a baking chamber, a door providing access to the baking chamber, and a blower for circulating air along an air flow path through the baking chamber, a heat exchanger includes a plurality of heat exchange tubes extending across a portion of the air flow path outside the baking chamber, each heat exchange tube including an input end and an output end. A plurality of in-shot burners are provided, each in-shot burner aligned for firing a flame into a respective one of the input ends. A burner housing is positioned about the in shot-burners and configured to increase air velocity along a length of each in-shot burner for reducing candling at gas orifices that provide gas to the in-shot burners.

In still another aspect, a heat exchanger system includes at least one heat exchange tube extending across a portion of an air flow path, the heat exchange tube including an input end. An in-shot burner has an input side and an output side, with the output side aligned for firing a flame into the input end of the heat exchange tube. A gas source includes an orifice aligned to deliver gas to the input side of the burner. At least one blower is positioned for drawing air and combustion gases through the heat exchange tube. A burner housing is positioned about the in shot-burner and configured to increase air velocity along a length of the in-shot burner from the input side to the output side so as to reduce candling at the gas orifice when the in-shot burner is turned off.

In a further aspect, an oven installed and operating at an oven site includes a baking chamber defined by at least first and second walls, with a door providing access to the baking chamber. An anchor-free floor assembly includes a first baking chamber floor panel including an upwardly turned flange and a second baking chamber floor panel including an upwardly turned flange. A bottom portion of the second floor panel partially overlaps a bottom portion of the first floor panel. The upwardly turned flange of the first baking chamber floor panel is adjustably secured to the first wall of the baking chamber to provide vertical adjustability between the first baking chamber floor panel and the first wall, and the upwardly turned flange of the second baking chamber floor panel is adjustably secured to the second wall of the baking chamber to provide vertical adjustability between the second baking chamber floor panel and the second wall.

In another aspect, an oven includes a baking chamber defined by a plurality of walls, with a door providing access to the baking chamber. An anchor-free floor assembly includes a first baking chamber floor panel including a connecting part and a second baking chamber floor panel including a connecting part. A bottom portion of the second floor panel partially overlaps a bottom portion of the first floor panel to accommodate thermal expansion of the one or both of the first and second floor panels. The connecting part of the first baking chamber floor panel is adjustably secured to at least one wall of the baking chamber to provide vertical adjustability between the first baking chamber floor panel and the one wall, and the connecting part of the second baking chamber floor panel is adjustably secured to one wall of the baking chamber to provide vertical adjustability between the second baking chamber floor panel and the one wall.

BRIEF DESCRIPTION OF DRAWINGS

FIGS. 12 and 13 show air flow through the burner box;

FIGS. 18A and 18B are partial cross-sections illustrating connection of the floor walls of an oven;

FIG. 22 is a top view of a heat exchanger assembly with baffle system;

FIG. 23 is an end elevation of FIG. 22; and

DESCRIPTION

Figure 1:
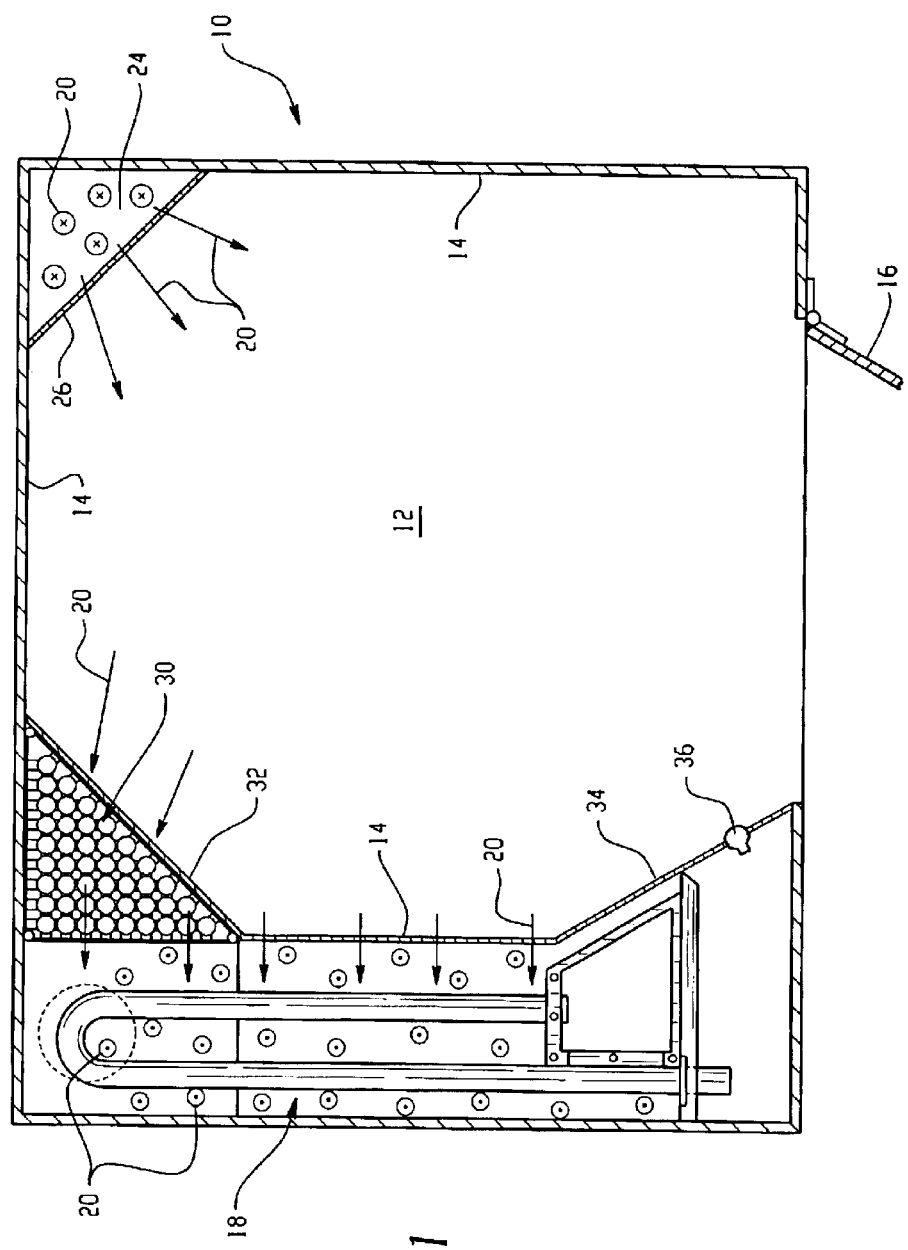
FIG. 1 is a top plan view of an oven.
Figure 2:
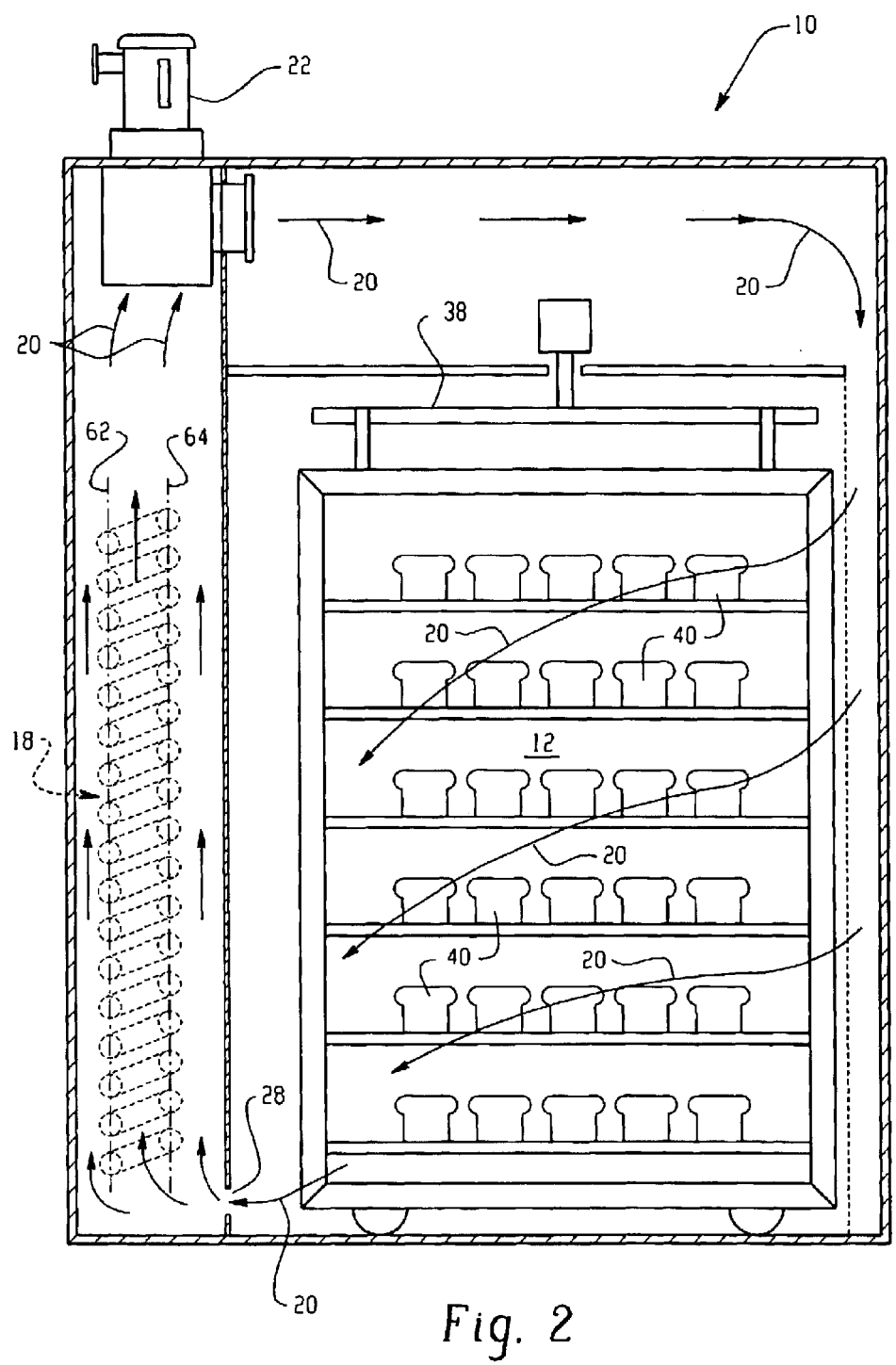
FIG. 2 is front elevation of the oven of FIG. 1.
Figure 3:
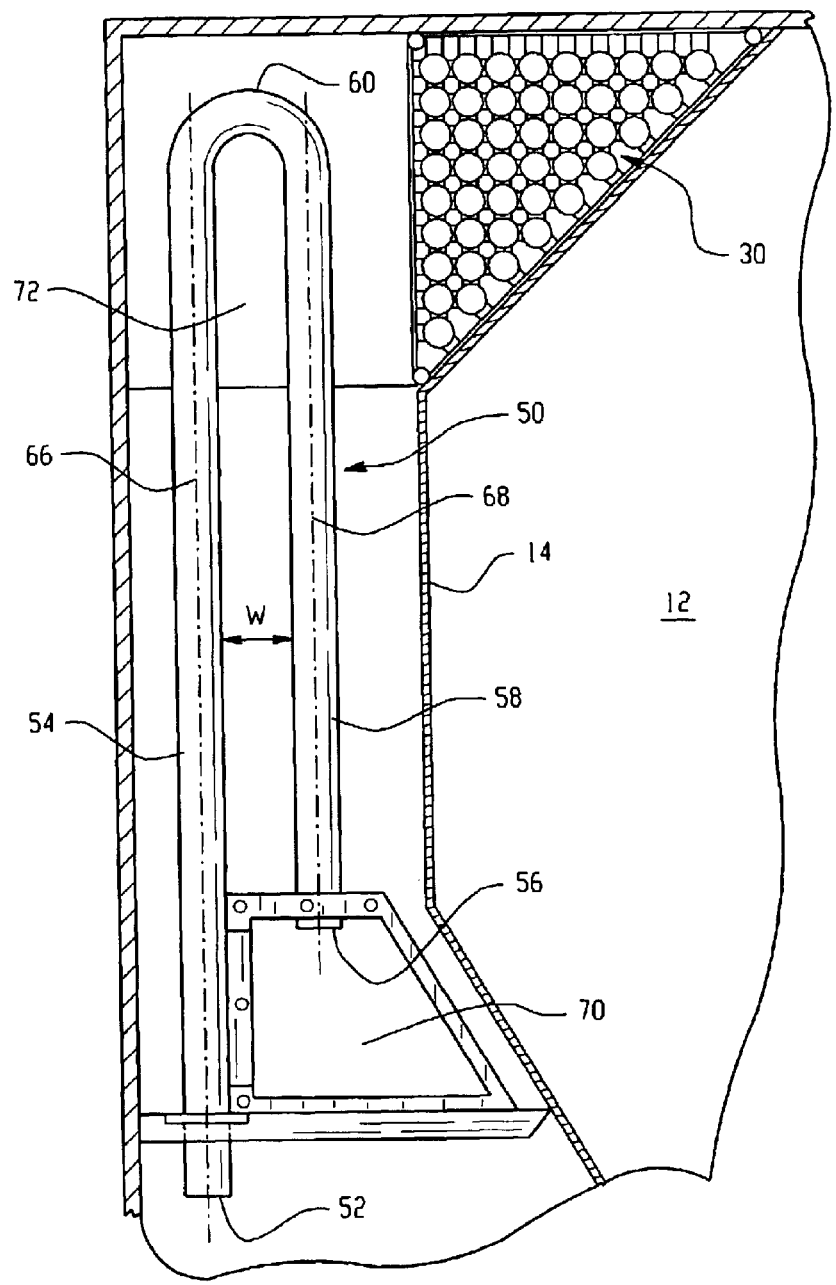
FIG. 3 is a top view of a heat exchanger section of the oven.

Referring to FIG. 1, a top plan view of an oven 10 is shown. The oven 10 includes a baking chamber 12 defined by a plurality of walls 14. Door 16 (shown only in part) provides access to the baking chamber. A heat exchanger 18 is located outside the baking chamber 12. As shown by the arrows 20 in FIGS. 1 and 2, during a baking procedure a fan or other blower 22 may be operated to cause heated air to flow along an air flow path that extends upward through the heat exchanger 18, over the top of the baking chamber 12, downward through a corner channel 24, through a panel 26 into and through the baking chamber 12, through a slot 28 or series of openings in the left baking chamber wall 14 and back up through the heat exchanger 18. A portion of the heated air also flows through a corner located steam generator 30, with a panel 32 (having apertures or slots) separating the steam generator 30 from the baking chamber 12, and with wall 14 including an opening or openings that extend along the height of the steam generator 30 to provide the air into the heat exchanger 18. The steam generator 30 may take the form of a thermal mass, such as an iron mass that collects heat, and an associated source of water that delivers water onto the thermal mass, with heat of the thermal mass converting the water to steam. The panel 32 may also be solid (no apertures or slots) and mounted in a manner spaced from walls 14 and or the floor to provide air flow slots. A front, left corner panel 34 with one or more lights 36 positioned therein is also shown in FIG. 1. Also shown in FIG. 2 is a rotatable rack 38 within baking chamber 12, the rack holding goods 40 to be baked. The oven includes a lift and rotate mechanism (as known in the art) to lift and rotate the rack. The rack 38 can be lowered and wheeled out of the baking chamber 12 through the doorway. The oven 10 may be a single integrated unit or may be formed by modules connected together, such as a baking chamber module and a heat exchanger module.

Referring to the partial views of FIGS. 3–6, the heat exchanger 18 is now described. The heat exchanger includes a plurality of heat exchange tubes 50 extending across a portion of the heated air flow path outside the baking chamber 12. Each heat exchange tube 50 includes an input end 52 associated with a first linear segment 54, an output end 56 associated with a second linear segment 58 and a bend 60 connecting the first linear segment 54 to the second linear segment 58 such that the second linear segment 58 extends substantially parallel to the first linear segment 54. The plurality of heat exchange tubes are arranged vertically to align the first linear segments 54 in a first substantially vertical plane 62 and to align the second linear segments 58 in a second substantially vertical plane 64, where the first substantially vertical plane 62 is offset laterally from, and is parallel to the second substantially vertical plane 64. The first substantially vertical plane 62 is defined through axes 66 of the first linear tube segments 54 and the second substantially vertical plane 64 is defined through axes 68 of the second linear tube segments 58. In the illustrated embodiment a length of the first linear segment 54 of each heat exchange tube 50 is greater than a length of the second linear segment 58 of each heat exchange tube 50.

In the illustrated embodiment, the first linear tube segments define a first substantially vertical tube array that is spaced apart from a second substantially vertical tube array defined by the second linear segments. In an alternative construction, each heat exchange tube may be defined by a single linear segment, and the first substantially vertical tube array may be defined by a first group of tubes and the second substantially vertical tube array may be defined by a second group of tubes. In one embodiment of the alternative construction, both the first group of tubes and the second group of tubes may feed into a common exhaust flue or duct, such that both groups of tubes carry combustion gases in the same direction. In another embodiment of the alternative construction, both groups of tubes may connect to a gas collection duct or ducts that serve to carry combustion gases from the first group of tubes to the second group of tubes, in which case the first group of tubes will carry combustion gases in a direction opposite that of the second group of tubes.

In one embodiment, a lateral distance between the first substantially vertical plane 62 and the second substantially vertical plane 64 is between about 3.5 inches and about 8 inches and an outer diameter of each of the first tube segments 54 and second tube segments 58 is between about 1.25 inches and about 2.5 inches. However, variations are possible.

Figure 5:
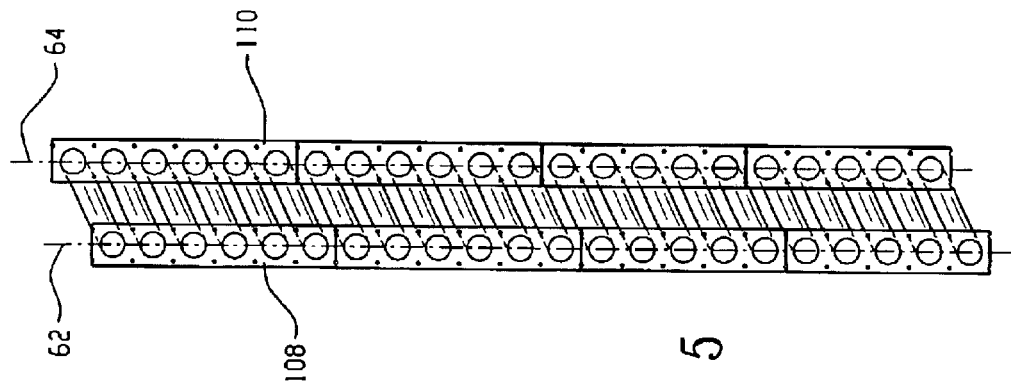
FIG. 5 is an end elevation of the heat exchange tube assembly.
Figure 7C:
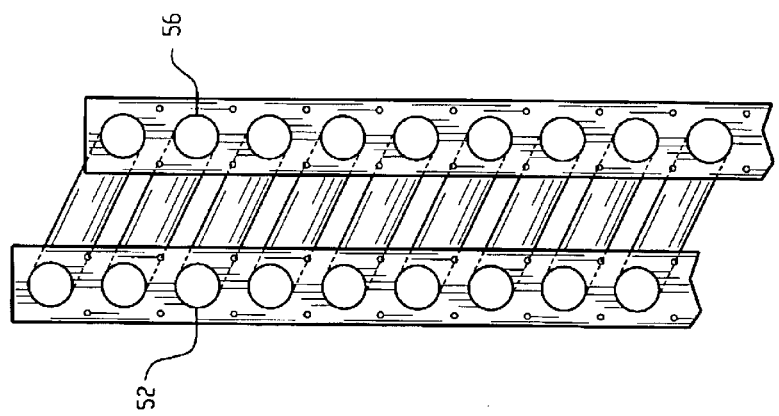
FIGS. 7A–7C show various heat exchange tube arrangements.
Figure 7B:
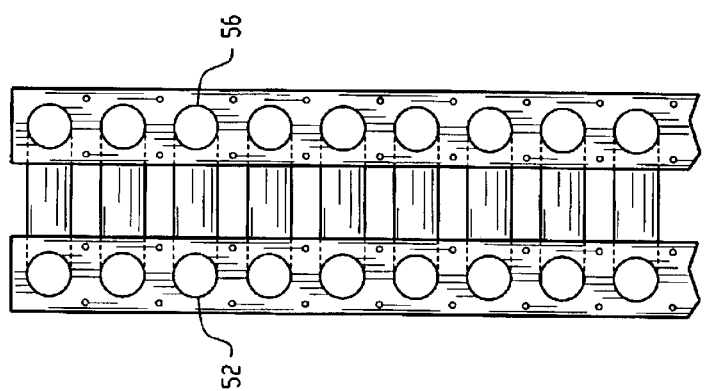
Figure 7A:
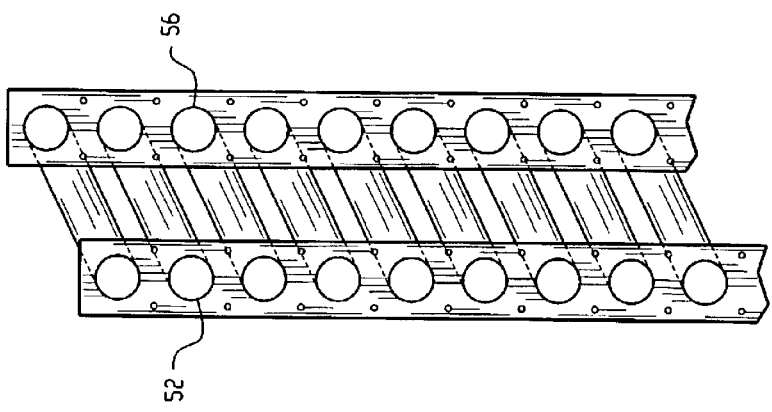

Each heat exchange tube 50 may be angled to vertically displace the second linear segment 58 of each heat exchange tube from the first linear segment 54 as best shown in FIGS. 1 and 5 where the second linear segment 58 of each heat exchange tube is positioned higher than the first linear segment. However, as reflected by the embodiments suggested by FIGS. 7A–7C, other variations are possible including variations where the first linear tube segments 54 and second linear tube segments are at the same vertical height (FIG. 7B) and variations wherein the second linear tube segments 58 are lower than the first linear tube segments 54 (FIG. 7C).

The output ends 56 of the tubes are associated with a vertical exhaust duct 70 for exhausting combustion gases delivered through the tubes. The spaced apart tube segments 54 and 58 define a vertical air flow region 72 therebetween. In one embodiment a width W (tube edge to tube edge) of the substantially vertical air flow path is between about 1 inch and about 6.75 inches and in other embodiment a width of the substantially vertical air flow path is between about 3 inches and about 6 inches.

Figure 8:
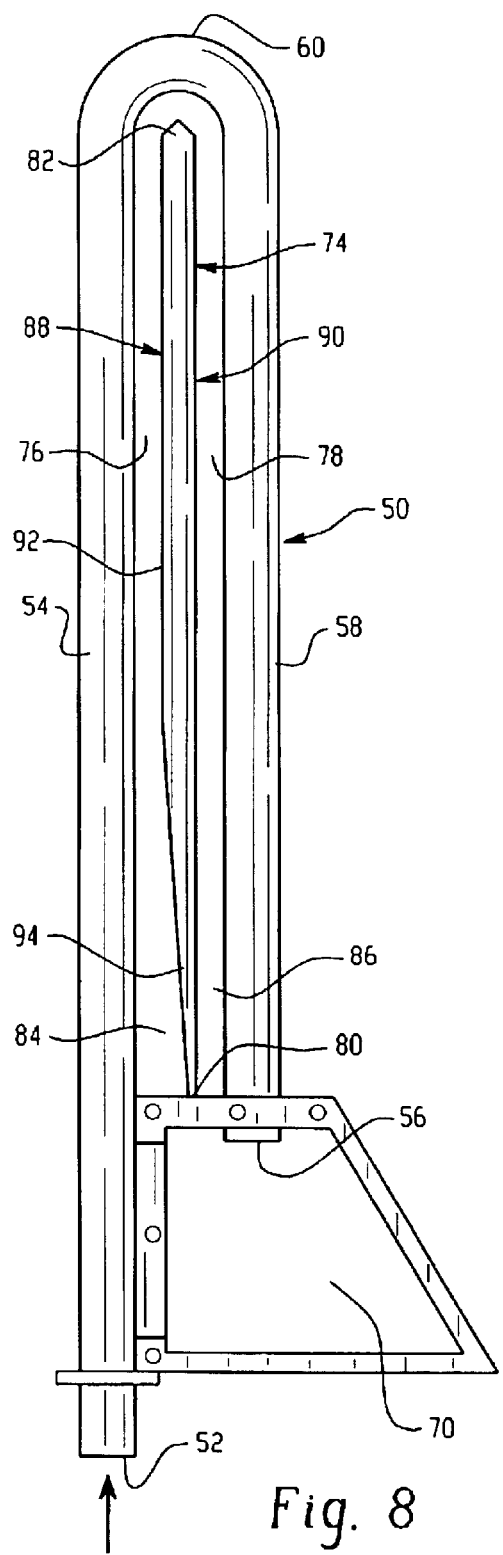
FIG. 8 top view of a heat exchange tube arrangement with baffle.
Figure 9:
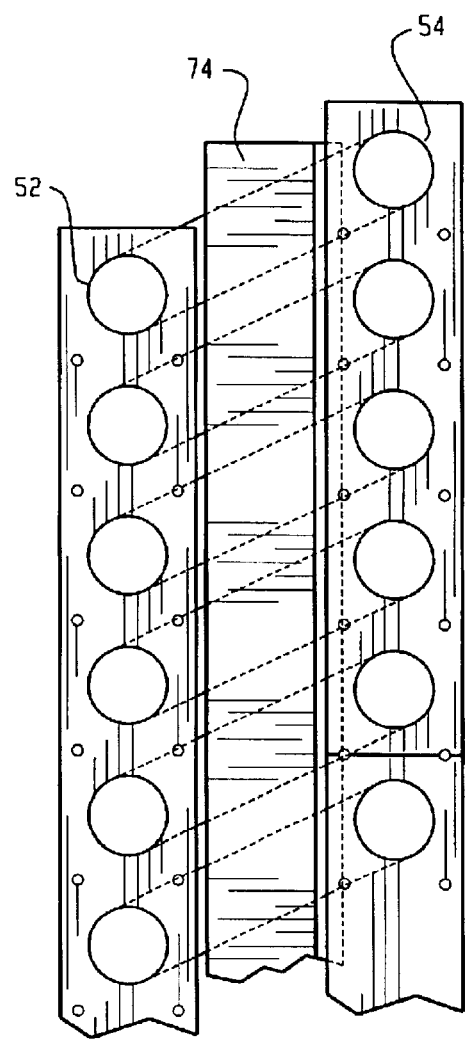
FIG. 9 is a partial front elevation of the baffle.

In the embodiment illustrated in FIG. 8 a baffle system includes a substantially vertical baffle member or panel member 74 provided in the region 72 to increase the air velocity past or in proximity to the tube segments 54 and 58 and the bends 60, thereby increasing the amount of heat transferred to the air. The baffle member 74 divides the vertical air flow path 72 into a first path part 76 and a second path part 78. The baffle includes a first end 80 and a second end 82. The baffle may be positioned and configured to provide an airflow volume in a region 84 of the first path part and near the baffle first end that is greater than an airflow volume in a region 86 of the second path part and near the baffle first end. This construction provides higher heat transfer at the input ends 52 of the tubes where more heat is likely to be concentrated. In the illustrated embodiment a lateral thickness of the first end 80 of the baffle is less than a lateral thickness of the second end 82 of the baffle for this purpose. The baffle member 74 includes a first side 88 and a second side 90, with the first side facing toward the first linear segments 54 and having at least two angularly intersecting walls 92 and 94 and the second side 90 facing toward the second linear segments 58 and being substantially planar. Other configurations are possible. As shown in FIG. 9, the baffle member 74 may extend vertically upward past the first linear segment of the top heat exchanger tube 50 to eliminate stagnation that might otherwise occur above the top tube.

In another embodiment, described with reference to FIGS. 22 and 23, a baffle system includes panel portions 250 extending between respective, vertically adjacent tube segments 58. The panel portions 250 extend across the substantially vertical plane 64 to impart a turbulence to air flow through the heat exchanger. The air flow path upward along tube segments 54 is substantially unobstructed by the panel portions 250, while the air flow path upward along tube segments 58 is obstructed for creation of a turbulent flow. In the illustrated embodiment, a number of the panel portions 250 are formed together as U-shaped unit 252, while one panel portion is formed as a separate unit 254 with a slight upward bend. In either case, the units 252 and 254 may be connected to and extend from a side wall 256 that defines the heat exchanger section, thereby obstructing a direct vertical air flow path in the region of tube segments 64. In one embodiment, the tube segments 58 are positioned apart by a vertical distance Y1 in the range of about 2.5 to about 3.0 inches, the tube segments 58 are positioned apart from tube segments 54 by a horizontal distance X1 in the range of about 3.5 to about 4.0 inches, the panel portions 250 are positioned spaced apart by a vertical distance Y2 in the range of about 5.0 inches to about 6.0 inches, and the lateral width X2 of the panel portions is in the range of about 4.0 inches to 5.0 inches, with an overall width X3 of vertical air flow region in the heat exchanger section being in the range of about 6.5 inches to about 8.0 inches.

Figure 4:
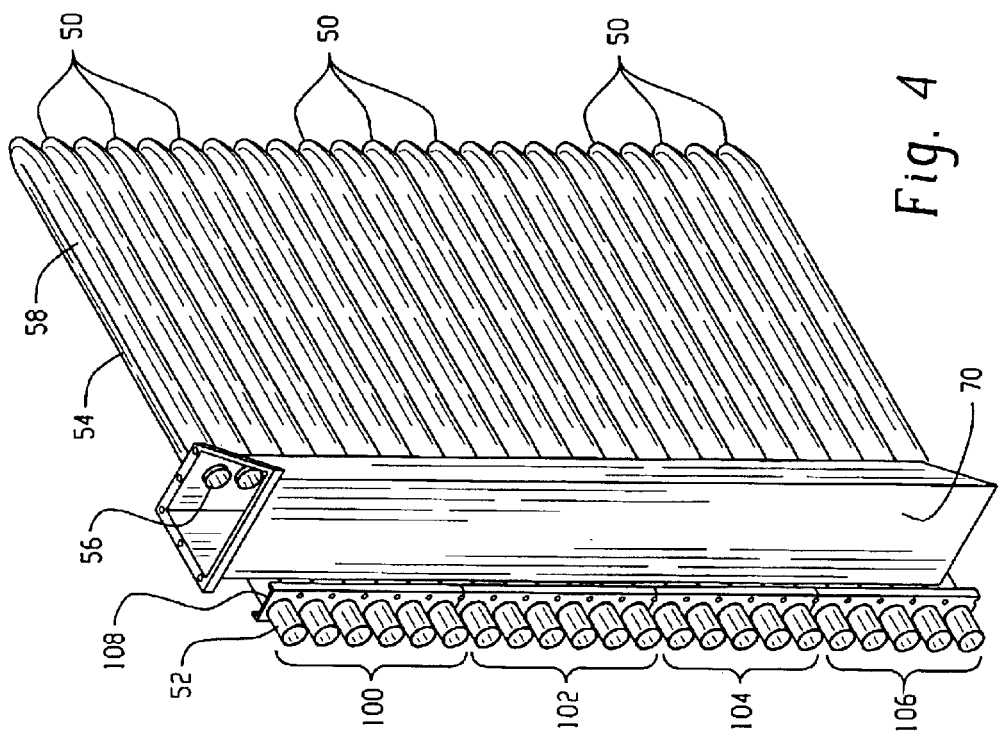
FIG. 4 is a perspective view of a heat exchange tube assembly.
Figure 6:
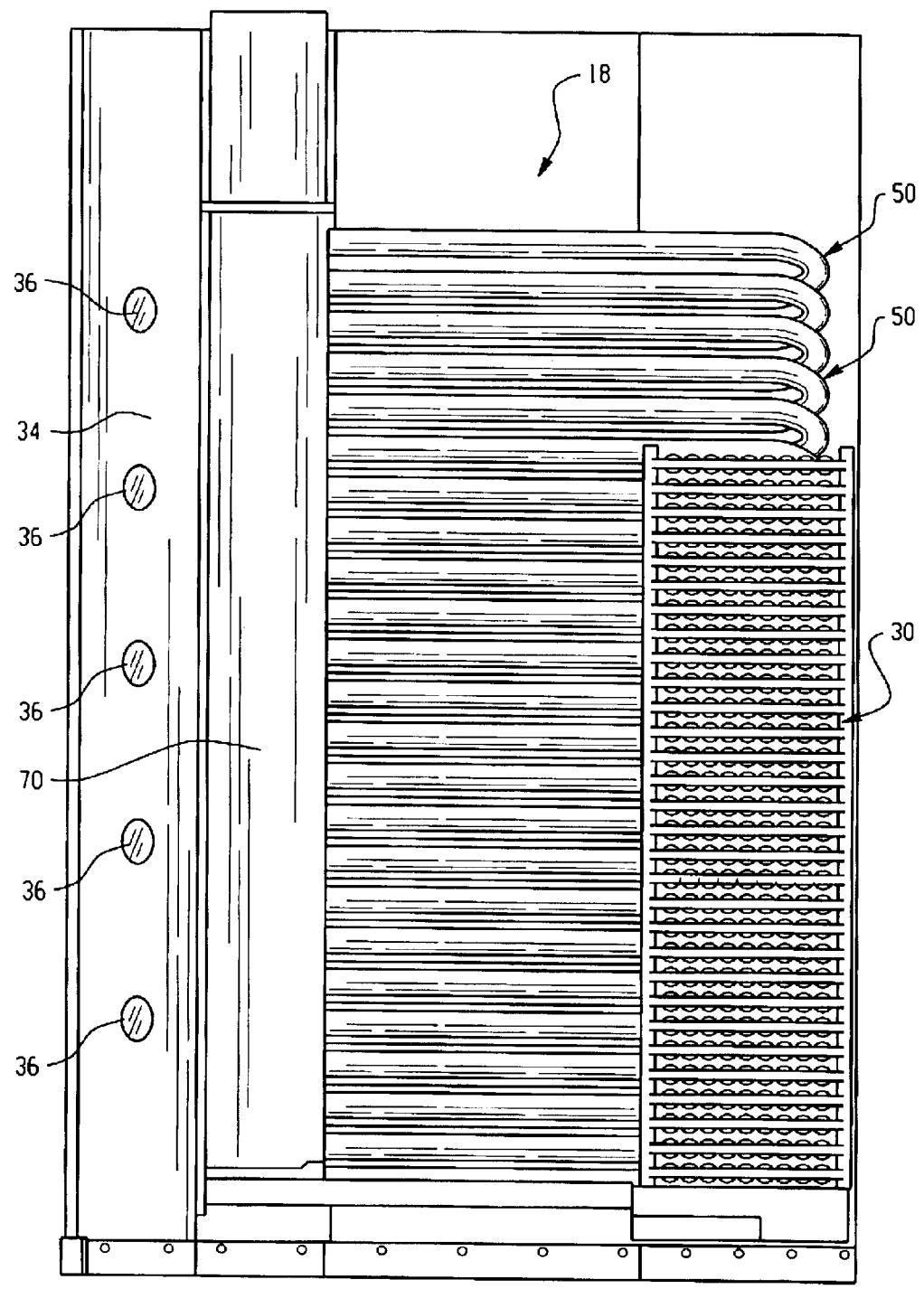
FIG. 6 is a side elevation of FIG. 3.

As best seen in FIGS. 4 and 5, the heat exchanger tubes 50 may be manufactured in groups to produce tube units 100, 102, 104 and 106, with support brackets 108 and 110 respectively supporting the ends 52 and 54 of the tubes in a fixed manner relative to each other. Units 100 and 102 are shown as six tube units and units 104 and 106 are shown as five tube units, but variations are possible. The brackets 108 and 110 of each unit are stacked upon each other when the units 100, 102, 104, and 106 are stacked. Adjacent brackets can then be welded if desired for support, or fasteners or connectors can be used to hold vertically adjacent units together.

Figure 10:
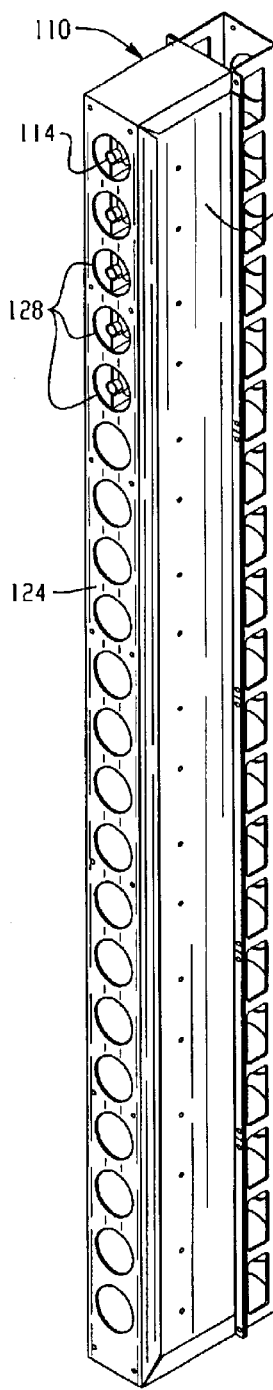
FIGS. 10 and 11 are perspective views of a burner box.
Figure 11:
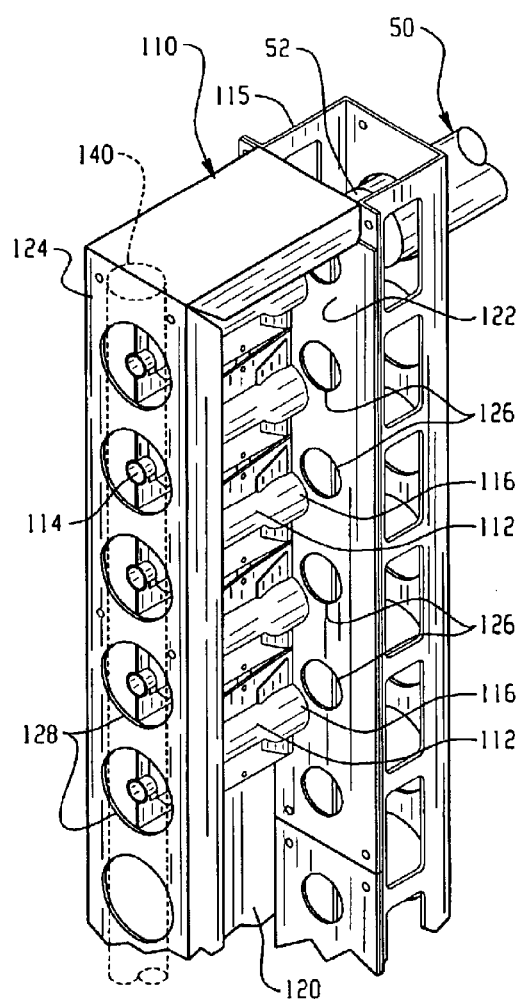
Figure 14:
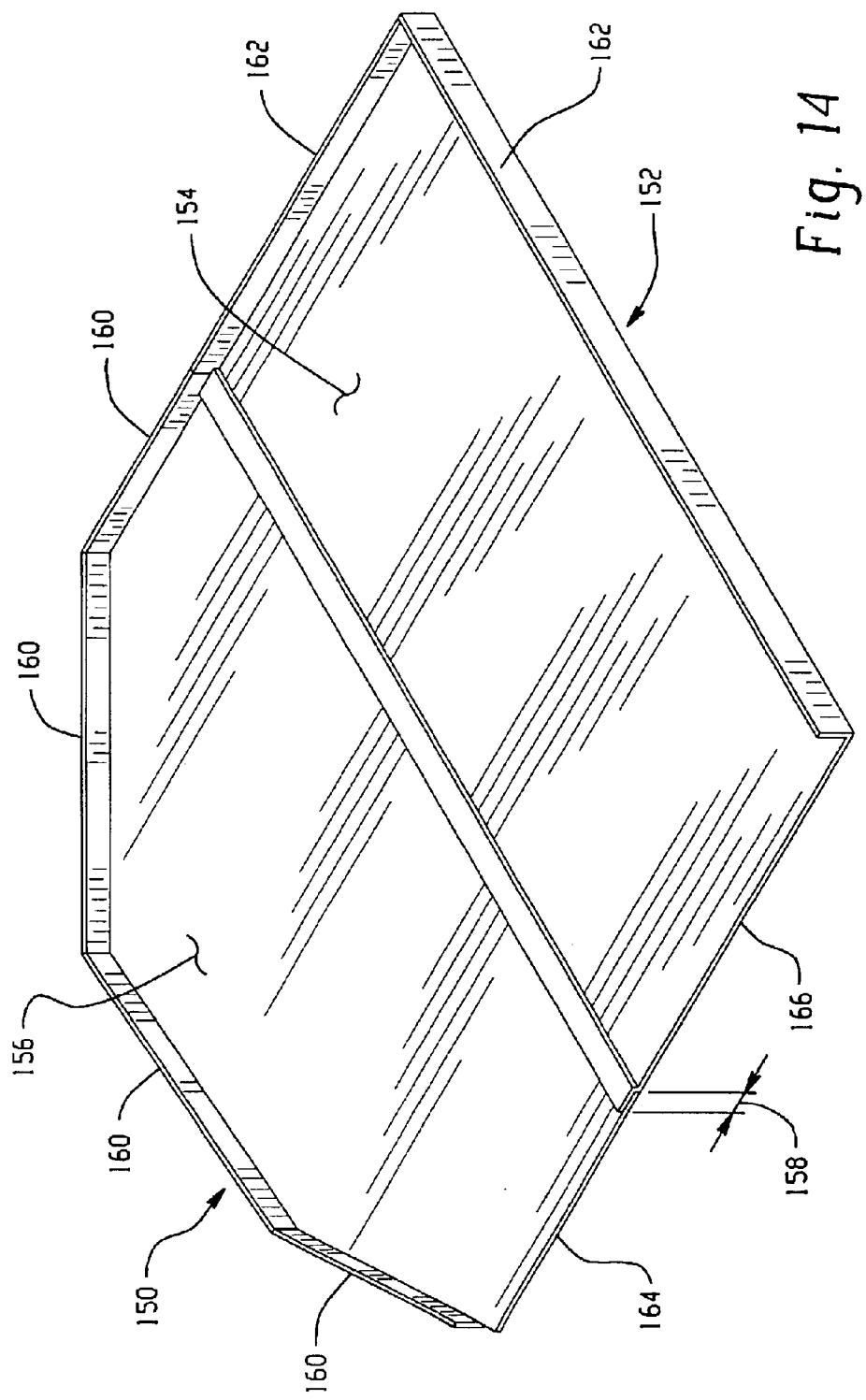
FIG. 14 is a perspective view of a floating floor.

Referring to FIGS. 10–13, additional components of the heat exchanger are now described, including the gas burners used to produce the heat delivered through the tubes. In particular, FIG. 10 shows a vertically arranged burner housing 110 positioned about a vertical arrangement of gas burners 112. Each of the plurality of gas burners is associated with a respective input end 52 of a respective heat exchange tube 50 for delivering combustion gases through the respective heat exchange tube 50. A single representative heat exchange tube 50 is shown in FIG. 11. A substantially vertical mounting bracket or channel 115 is shown and the burner housing 110 may be attached thereto. In the illustrated embodiment, each gas burner 112 comprises an in-shot burner having an input side 114 and an output side 116. During combustion the in-shot burners fire a flame directly into corresponding, aligned heat exchange tubes. The burner housing 110 positioned about the in shot-burners is configured to increase air velocity axially along a length of each in-shot burner 112.

In the illustrated embodiment, the burner housing 110 includes substantially closed and opposed side walls 120, a flame outlet wall 122 and an air inlet wall 124. Substantially closed top and bottom walls are also provided. The flame outlet wall 122 includes a plurality of apertures 126 each aligned with a respective burner output side 116 and a respective input end 52 of a respective heat exchange tube 50. The air inlet wall 124 includes a plurality of apertures 128 each aligned with a respective burner input side 114. This construction increases an air velocity along an axial length of each burner as compared to a construction having no burner box or a construction having a burner box without an air inlet wall 124. In particular, apertures 128 can be sized such that during firing of the in-shot burners 112, air drawn axially along the length of the burners by the induced draft is at a higher velocity than if the air inlet wall was completely eliminated, opening the backside of the burner housing, because of the restricted air inlet area provided by the wall with apertures (FIG. 12). When the gas valve to the gas manifold 140 that feeds the burners is closed, air drawn axially along and through the gas burners 112 due to continued operation of an exhaust fan (discussed later) is sufficient to assure that any flame that continues due to the residual gas in the manifold 140 stays at the output side 116 of the burner 112 so that candling at the orifices of the gas manifold is eliminated. The manifold 140 may include brass fittings 142 connected thereto, with each fitting having an end orifice aligned with an input side of a respective burner 112. It is recognized that other structural configurations could be used to crate the air flow along the axial length of the burners and thereby reduce candling.

Figure 19:
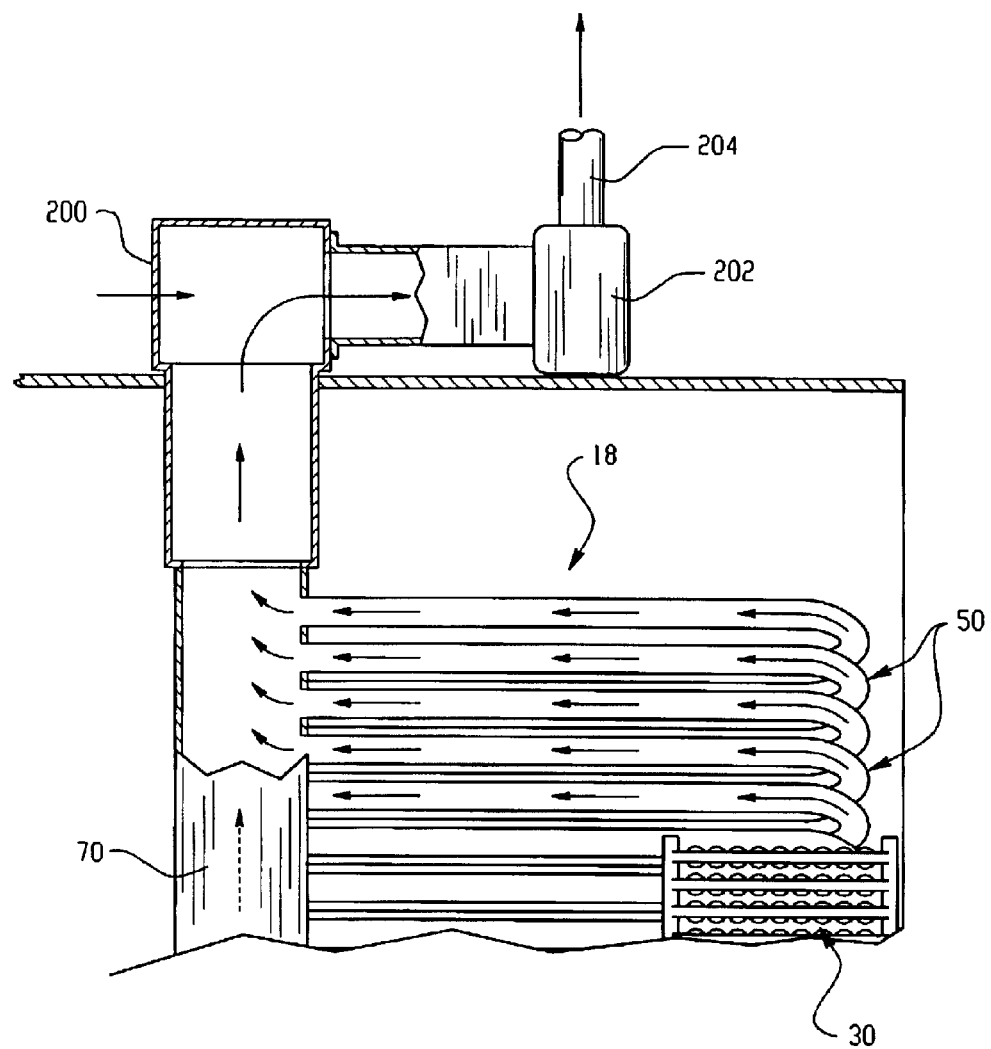
FIG. 19 is a side elevation of a heat exchanger and associate exhaust path.

Referring to FIG. 19, the exhaust duct 70 may be connected in-line with an exhaust collection box 200 atop the oven that in turn connects to a blower 202 for inducing a draft through the heat exchange tubes 50 to properly expel combustion gases to an exhaust stack 204. The blower might also be integrated with the box 200. The box 200 may include suitable shuttered air passages to allow secondary, ambient air to be pulled into the system along with the combustion gases, cooling the combustion gases that are finally exhausted. The shuttered air passages can also be controlled to control the amount of air drawn through the heat exchanger tubes. In oven operation the blower 202 would typically be operated for 15–30 seconds prior to igniting the gas burners (pre-burn purge), and would also be operated for 15–30 seconds after the burners are turned off (post-burn purge), however, these time periods could vary.

During baking operations in rack ovens, a steaming process takes place by delivering water to the thermal mass of the steam generator. The steam produced infiltrates the entire oven and condenses on the cool surface of the unbaked bread or other goods. At the end of the predetermined steaming period (usually about 10 to 30 seconds), the flow of water to the steam generator is discontinued as bake cycle continues. The oven may include an active vent that quickly expels the steam from the oven and draws in ambient air to replace the steam.

Referring now to FIGS. 14-18, a floor construction for the baking chamber is described. In particular, an anchor-free construction is provided, meaning that the baking chamber floor does not have to be anchored by fasteners to the ground/floor of the site at which the oven is located. The construction includes a first baking chamber floor panel 150 and a second baking chamber floor panel 152. A bottom portion 154 of the second floor panel 152 partially overlaps a bottom portion 156 of the first floor panel 150 as shown along region 158. The second floor panel 152 may include an offset bend to achieve the overlap. In one embodiment, the overlapping portions of the two floor panels are not secured together, thus allowing some relative movement between the two floor panel bottom portions. The seam or overlap region 158 may be preferably placed in a center portion of the baking chamber so as to provide floor panels of approximately the same size, whereas if one floor panel were laterally larger than the other floor panel, the larger floor panel would tend to experience greater thermal expansion. However, variations in size are possible.

Each of the floor panels 150 and 152 includes respective upturned flanges 160 and 162 that may be provided by simply bending portions of the floor panel. In this regard, the floor panels may be stainless steel or some other suitable material. The flanges 160 and 162 may be in the range of about 1 inch to 2 inches in height, although variations are possible. One side or portion 164 and 166 of each respective floor panel 150 and 152 is provided without the upturned flange to facilitate positioning of such portions along the doorway that provides access to the oven baking chamber. In one embodiment, the sides 164 and 166 are positioned to or stop at the interior side of the door so as not to interfere with the door or any gasket that may be associated with the bottom surface of the door for sealing purposes.

Figure 15A:
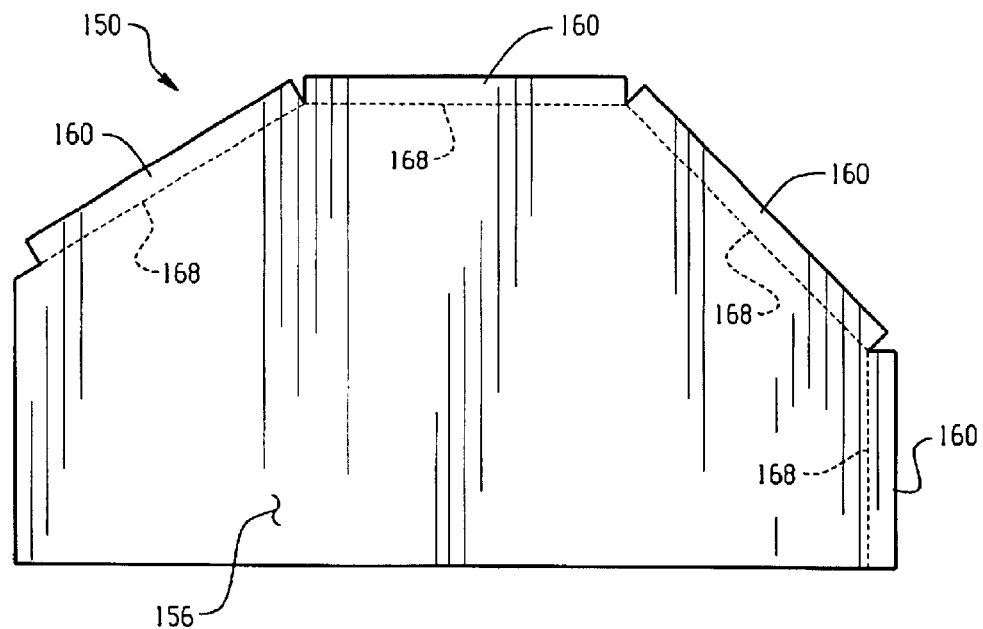
FIGS. 15A and 15B show one panel of the floor of FIG. 14.
Figure 15B:
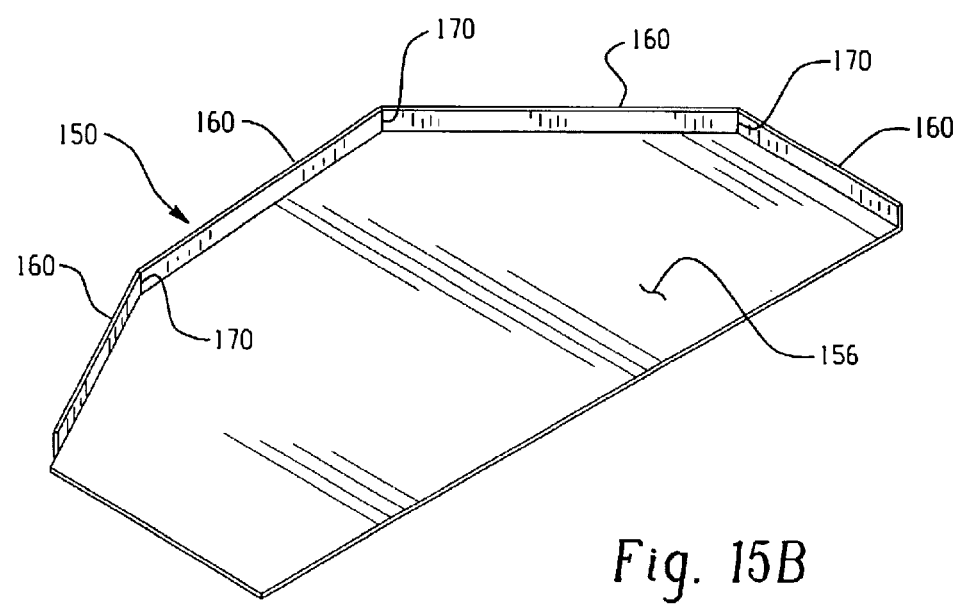

FIG. 15A illustrates a top view of floor panel 150 prior to final assembly, showing the floor panel as cut out from a sheet of metal and including bottom portion 156 and flange portions 160 prior to being bent into their upward positions. Bend lines 168 are shown in dashed form. FIG. 15B shows the floor panel 150 after the final bends have been made. The seams 170 between adjacent flanges 160 can be welded or otherwise sealed if desired.

Figure 16A:
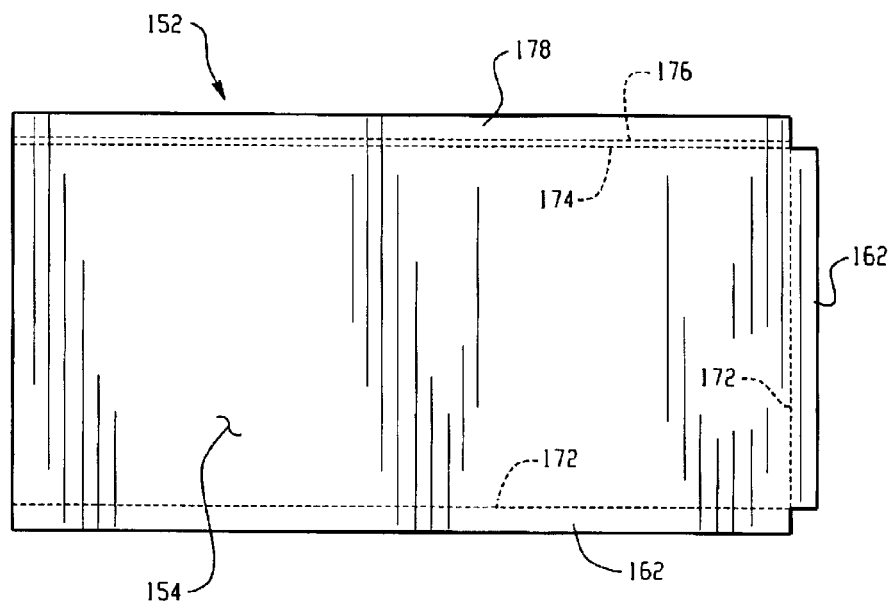
FIGS. 16A and 16B show another panel of the floor of FIG. 14.
Figure 16B:
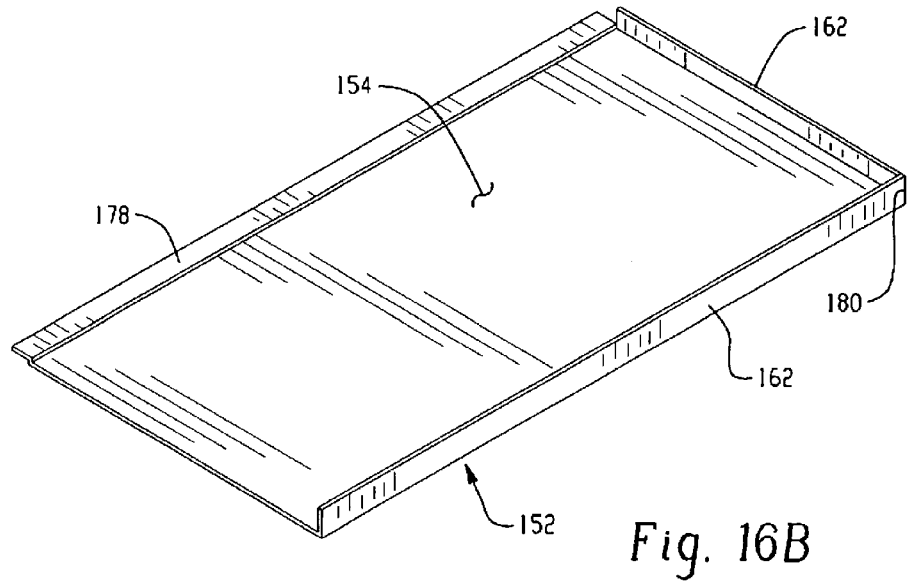
Figure 17:
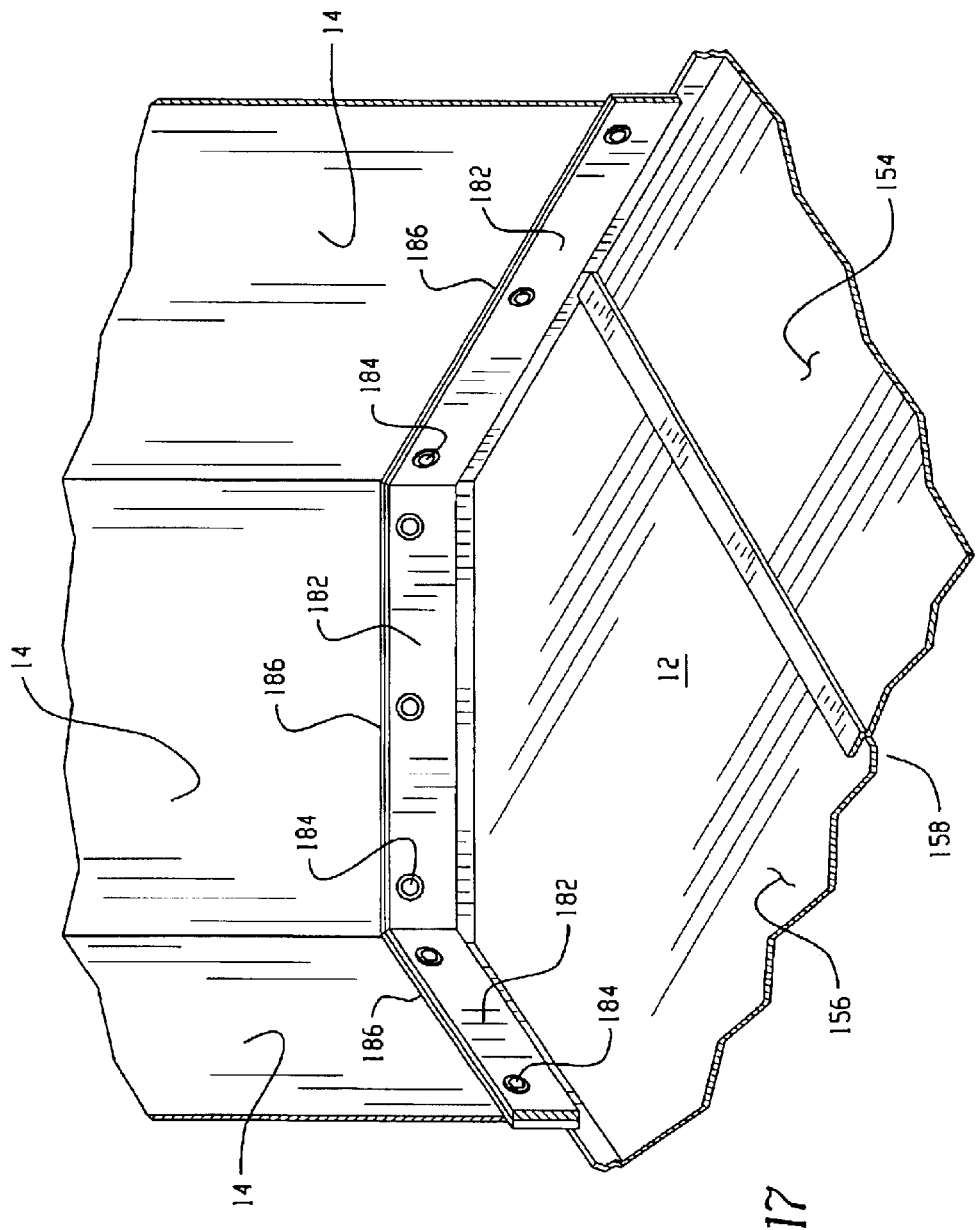
FIG. 17 is a partial illustration of an installed floating floor.

FIG. 16A shows a top view of floor panel 152 prior to final assembly, showing the floor panel as cut out from a sheet of metal and including bottom portion 154 and flange portions 162 prior to being bent into their upward positions. Bend lines 172 are shown in dashed form. Upward bend line 174 and downward bend line 176 are also shown for forming the previously mentioned offset bend portion 178. FIG. 16B shows the floor panel 152 after the final bends have been made. The seam 180 between adjacent flanges 162 can be welded or otherwise sealed if desired.

Upon installation, the two floor panels 150 and 152 are placed in the baking chamber 12 of the oven in the proper orientation. After the oven has been properly leveled, the floor panels are then adjustably secured to the oven walls in a manner to provide vertical adjustability between the floor panels and the oven walls if needed in the future. In one embodiment, as shown in the partial perspective view of an oven baking chamber 12 in FIG. 17, the walls 14 defining the baking chamber are provided with trim pieces 182, which in one embodiment may be simple strips of stainless steel. As shown in the cross-sectional views of FIGS. 18A and 18B where the floor panel 150 is considered, when the floor panels 150 are positioned within the chamber 12, the upwardly turned flanges 160 are positioned between the trim pieces 182 and the oven walls 14. Threaded fasteners 184 extend from the trim pieces 182 to engage the walls 14 and can be adjusted to secure the flanges 160 tightly therebetween and thus hold the floor panel 150 in the desired position. A gasket 186 may also be provided between the trim pieces 182 and the walls 14 to engage the flanges 160 and provide a sealing function to the arrangement. In the illustrated embodiment the gasket is positioned between the trim pieces 182 and the flanges 160.

Figure 20A:
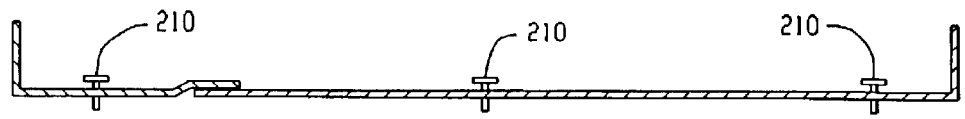
FIGS. 20A and 20B exemplify a PRIOR ART oven floor construction.
Figure 20B:
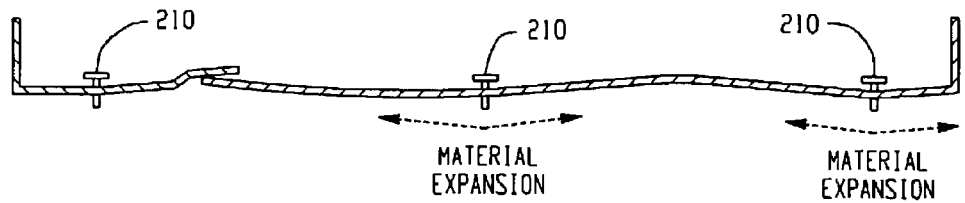
Figure 21A:
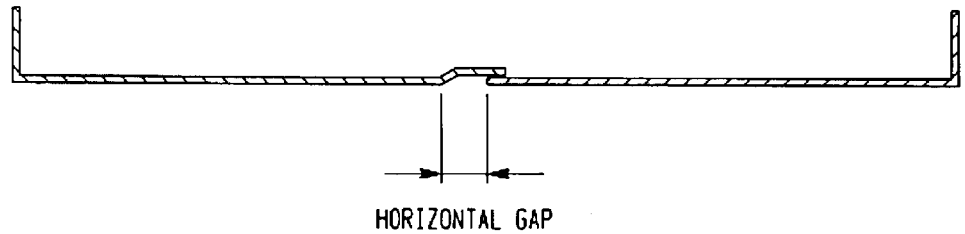
FIGS. 21A and 21B exemplify a floating floor oven construction.
Figure 21B:
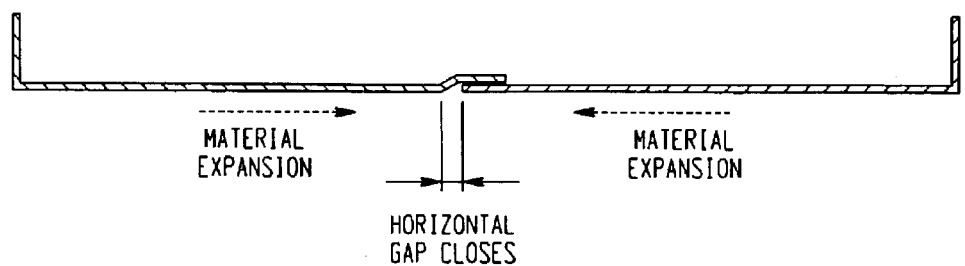
Figure 24A:
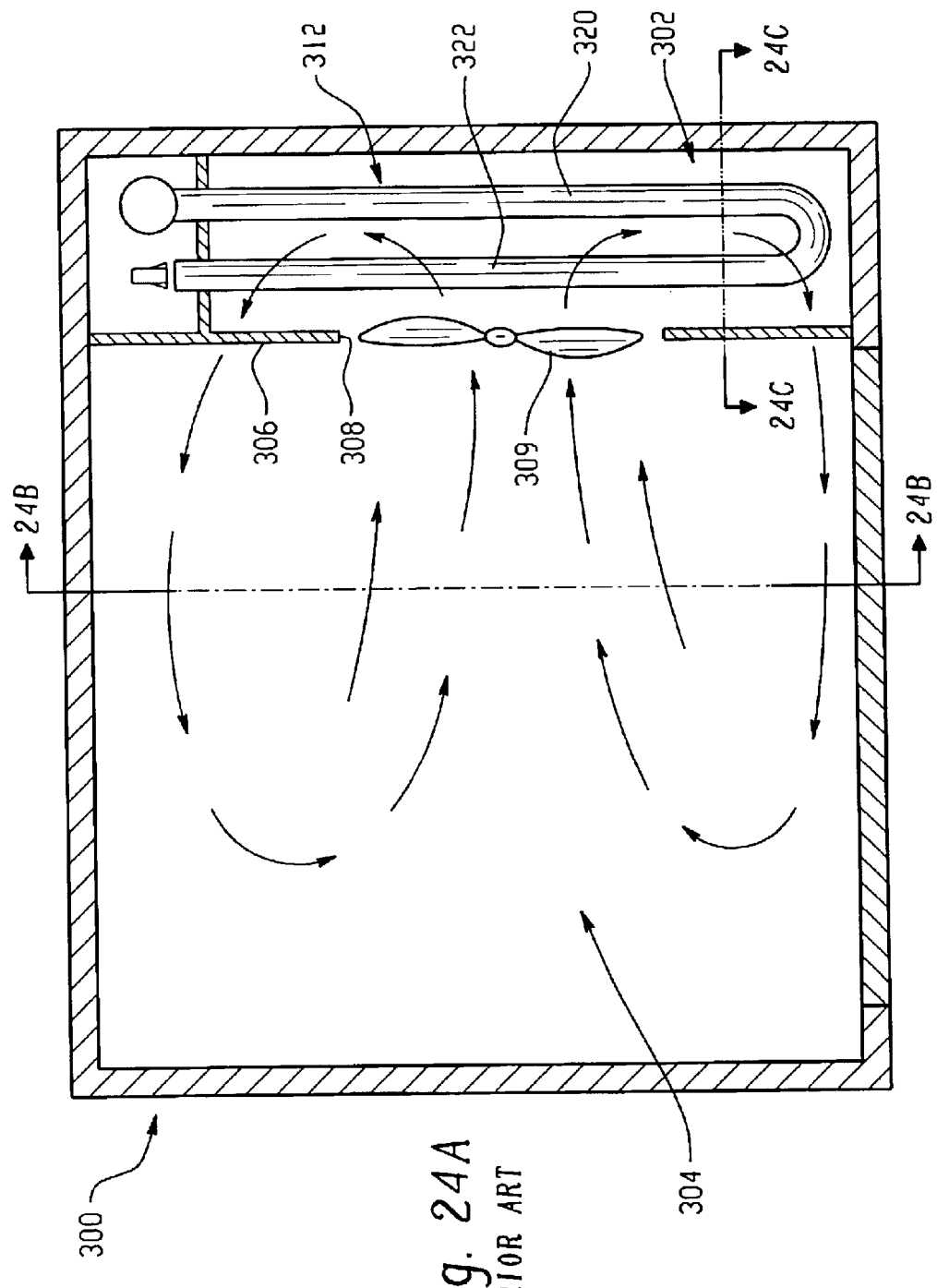
FIGS. 24A–24C illustrated a known, PRIOR ART oven construction.
Figure 24C:
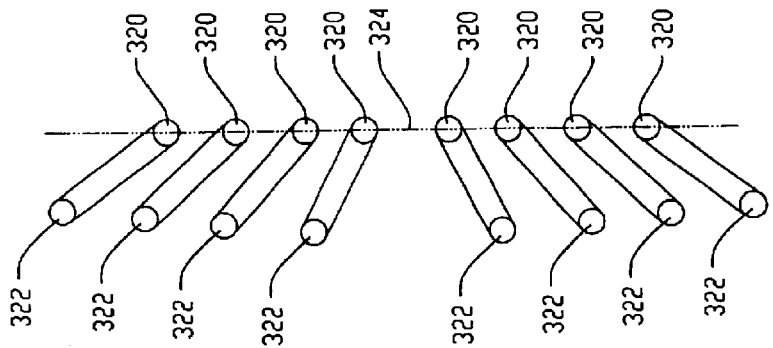
Figure 24B:
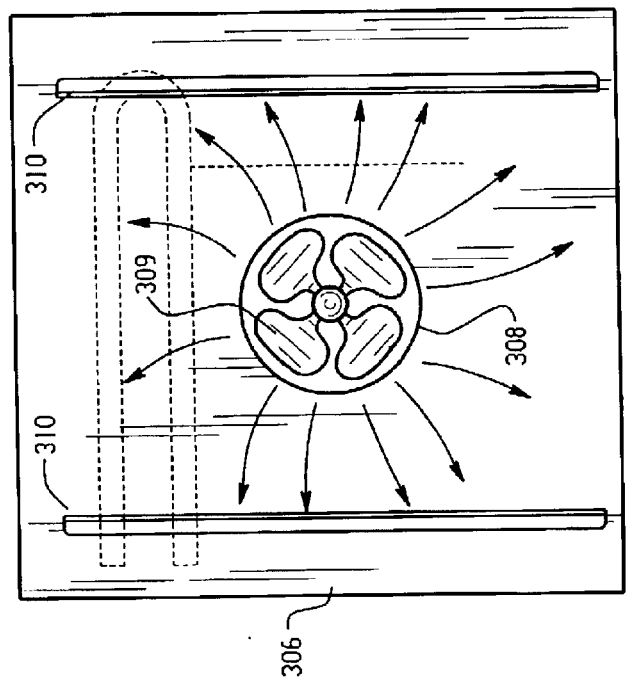

The flanges 160 are not engaged by the fasteners 184 and therefore can be adjusted upward or downward between the trim pieces 182 and the walls 14 when the fasteners 184 are loosened. This arrangement also enables the trim pieces 182 and associated fasteners 184 to be pre-applied to the oven walls 14 prior to delivery and set up. The illustrated adjustment zone may be in the range of about ½ inch to 2 inches, but variations are possible. This adjustment zone allows the floor panel 150 to be secured to the oven walls 14 at different heights so that the entire bottom portion 156 of the floor panel 150 can rest upon the oven site floor/ground regardless of how level the oven site floor/ground happens to be. If the oven is moved to a different site, adjustment to suit the new oven site floor/ground conditions is facilitated by simply loosening the fasteners 84, adjusting the floor panel 150 as needed and then re-tightening the fasteners 184. The multi-piece (2 or more floor panels) construction also accommodates thermal expansion with little or no floor buckling. Notably, FIGS. 20A and 20B illustrate buckling that can occur with anchored floors having anchor points 210. In particular, FIG. 20A illustrates two oven floor panels when at ambient temperature and FIG. 20B illustrates the buckling that can occur due to thermal expansion at elevated oven temperatures. In contrast, FIGS. 21A and 21B illustrate the accomodation of thermal expansion by the described anchor-free floor. In particular, FIG. 21A illustrates the relative position of the anchor-free floor panels at ambient temperature and FIG. 21B illustrates the accomodation of thermal expansion that occurs in the overlap region of the panels at elevated oven temperatures.

Although the invention has been described and illustrated in detail it is to be clearly understood that the same is intended by way of illustration and example only and is not intended to be taken by way of limitation. As an example, other types of gas burners might be used, such as gas-fired infrared burners inserted at the input ends of the heat exchange tubes. It is recognized that numerous other variations exist, including both narrowing and broadening variations of the appended claims.

What is claimed is:

1. In a convection oven including a baking chamber, a door providing access to the baking chamber, and a blower for circulating hot air along a heated air flow path that passes through the baking chamber, a heat exchanger comprising:
   a plurality of heat exchange tubes extending across a portion of the heated air flow path outside the baking chamber, each heat exchange tube including an input end associated with a first linear segment, an output end associated with a second linear segment and a bend connecting the first linear segment to the second linear segment such that the second linear segment extends substantially parallel to the first linear segment, the plurality of heat exchange tubes including a first heat exchange tube, a second heat exchange tube and one or more heat exchange tubes disposed between the first and second heat exchange tubes with the first, second and one or more heat exchange tubes arranged vertically to align the first linear segments of the first, second and one or more heat exchange tubes in a first substantially vertical plane and to align the second linear segments of the first, second and one or more heat exchange tubes in a second substantially vertical plane, where the first substantially vertical plane is offset laterally from the second substantially vertical plane; and
   a plurality of gas burners, each burner associated with a respective input end of a respective heat exchange tube for delivering combustion gases through the respective heat exchange tube.

2. The heat exchanger of claim 1 wherein the first substantially vertical plane is defined through axes of the first linear tube segments and the second substantially vertical plane is defined through axes of the second linear tube segments, a lateral distance between the first substantially vertical plane and the second substantially vertical plane being between about 3.5 inches and about 8 inches.

3. The heat exchanger of claim 2, wherein an outer diameter of each of the first tube segments and second tube segments is between about 1.25 inches and about 2.5 inches.

4. The heat exchanger of claim 1, further comprising:
   a substantially vertically extending baffle member positioned between the heat exchange tube first segments in the first substantially vertical plane and the heat exchange tube second segments in the second substantially vertical plane, the baffle member increasing speed of airflow proximate to the first and second tube segments.

5. The heat exchanger of claim 4, wherein the baffle member comprises a panel, the panel having a first end positioned toward the input ends and output ends of the heat exchange tubes and a second end positioned toward the bends of the heat exchange tubes, the first end having a lateral thickness less than a lateral thickness of the second end.

6. The heat exchanger of claim 1, wherein each heat exchange tube is angled to vertically displace the second linear segment of each heat exchange tube from the first linear segment.

7. The heat exchanger of claim 6, wherein the second linear segment of each heat exchange tube is positioned higher than the first linear segment.

8. The heat exchanger of claim 6, further comprising a substantially vertical mounting bracket supporting the plurality of heat exchange tubes proximate their input ends, the burner housing attached to the mounting bracket.

9. The heat exchanger of claim 1, wherein each gas burner comprises an in-shot burner having an input side and an output side, and the heat exchanger further comprises a vertically extending burner housing positioned about the in shot-burners, the burner housing including substantially closed and opposed side walls, a flame outlet wall and an air inlet wall, the flame outlet wall including a plurality of apertures each aligned with a respective burner output side and a respective input end of a respective heat exchange tube, the air inlet wall including a plurality of apertures each aligned with a respective burner input side for increasing an air velocity along a length of each burner.

10. The heat exchanger of claim 1, wherein a length of the first segment of each heat exchange tube is greater than a length of the second segment of each heat exchange tube.

11. In a convection oven including a baking chamber, a door providing access to the baking chamber, and a blower for circulating hot air along a heated air flow path that passes through the baking chamber, a heat exchanger comprising:

a plurality of heat exchange tubes extending across a portion of the heated air flow path outside the baking chamber, each heat exchange tube including an input end associated with a first linear segment, an output end associated with a second linear segment and a bend connecting the first linear segment to the second linear segment such that the second linear segment extends substantially parallel to the first linear segment, the plurality of heat exchange tubes arranged vertically to align the first linear segments in a first substantially vertical plane and to align the second linear segments in a second substantially vertical plane, where the first substantially vertical plane is offset laterally from the second substantially vertical plane;

a plurality of gas burners, each burner associated with a respective input end of a respective heat exchange tube for delivering combustion gases through the respective heat exchange tube; and a baffle system associated with the plurality of heat exchange tubes.

12. The heat exchanger of claim 11, wherein the baffle system comprises a plurality of panel portions extending between respective, vertically adjacent tube segments, the panel portions extending across at least one of the substantially vertical planes to impart a turbulence to air flow through the heat exchanger.

13. The heat exchanger of claim 12, wherein at least two panel portions are formed together as extensions of a U-shaped member.

14. The heat exchanger of claim 12, wherein the panel portions extend across only the second substantially vertical plane.

15. In a convection oven including a baking chamber, a door providing access to the baking chamber, and a blower for circulating hot air along a heated air flow path that passes through the baking chamber, a heat exchanger comprising:

a plurality of heat exchange tubes extending across a portion of the heated air flow path outside the baking chamber, the plurality of heat exchange tubes including a first heat exchange tube, a second heat exchange tube and one or more heat exchange tubes disposed between the first and second heat exchange tubes such that the first; second and one or more heat exchange tubes arranged to form first and second spaced apart vertical tube arrays, the tubes of the first tube array having respective axes that lie in a first substantially vertical plane and the tubes of the second tube array having respective axes that lie in a second substantially vertical plane, the spaced apart first and second vertical tube arrays defining a substantially vertical air flow path therebetween; and a baffle system associated with the plurality of heat exchange tubes.

16. The heat exchanger of claim 15, wherein the tubes of the first vertical tube array are first linear segments of corresponding U-shaped tubes, the tubes of the second vertical tube array are second linear segments of the corresponding U-shaped tubes, for each U-shaped tube an input end is associated with its first linear segment, an output end is associated with its second linear segment and a lateral bend connects the first linear segment to the second linear segment such that the second linear segment extends substantially parallel to and is laterally spaced from the first linear segment.

17. The heat exchanger of claim 16 wherein the baffle system comprises a panel member positioned along the substantially vertical air flow path to increase an air flow speed in proximity to the first and second vertical tube arrays.

18. The heat exchanger of claim 17 wherein the panel member divides the substantially vertical air flow path into first and second path parts, the first path part defined between the panel member and the first linear segments and the second path part defined between the panel member and the second linear segments, wherein the panel member has a first end positioned toward the input ends and output ends of the heat exchange tubes, the panel member positioned and configured to provide an airflow volume in the first path part and near the panel member first end that is greater than an airflow volume in the second path part and near the panel member first end.

19. The heat exchanger of claim 18 wherein the panel member first end has a lateral thickness less than a lateral thickness of the panel member second end.

20. The heat exchanger of claim 19 wherein the panel member includes a first side facing toward the first linear segments and having at least two angularly intersecting walls.

21. The heat exchanger of claim 20 wherein the panel member includes a substantially planar second side facing toward the second linear segments.

22. The heat exchanger of claim 15 wherein the baffle system comprises a plurality of panel portions extending between respective, vertically adjacent tubes, the panel portions extending across at least one of the substantially vertical planes and at least partially into the substantially vertical air flow path to impart a turbulence to air flow through the heat exchanger.

23. The heat exchanger of claim 22 wherein at least two panel portions are formed together as extensions of a U-shaped member.

24. The heat exchanger of claim 22 wherein the baffle system includes at least two U-shaped members spaced apart vertically and defining at least four panel portions.

25. The heat exchanger of claim 22 wherein the panel portions extend across only the second substantially vertical plane.

26. The heat exchanger of claim 15 wherein each heat exchange tube is defined by a single linear segment and the first vertical tube array is defined by a first group of said heat exchange tubes and the second vertical tube array is defined by a second group of said heat exchange tubes.

27. The heat exchanger of claim 26 wherein the first group of said heat exchange tubes and the second group of said heat exchange tubes carry combustion gases in a same direction.

28. The heat exchanger of claim 26 wherein the first group of heat exchange tubes carries combustion gases in a direction opposite that of the second group of heat exchange tubes.

29. The heat exchanger of claim 15, further comprising:
a plurality of gas burners, each associated with a respective input end of a respective one of the heat exchange tubes for delivering combustion gases therethrough.

30. The heat exchanger of claim 15 wherein a width of the substantially vertical air flow path is between about 1 inch and about 6.75 inches.

31. The heat exchanger of claim 30 wherein a width of the substantially vertical air flow path is between about 3 inches and about 6 inches.

32. The heat exchanger of claim 30 wherein an outer diameter of each of the first tube segments and second tube segments is between about 1.25 inches and about 2.5 inches.

33. In a convection oven including a baking chamber, a door providing access to the baking chamber, and a blower for circulating hot air along a heated air flow path that passes through the baking chamber, a heat exchanger comprising:
at least first and second tube assemblies, each assembly including:
a plurality of heat exchange tubes fixed together into a unit, each heat exchange tube including an input end associated with a first linear segment, an output end associated with a second linear segment and a bend connecting the first linear segment to the second linear segment, the plurality of heat exchange tubes including a first heat exchange tube, a second heat exchange tube and one or more heat exchange tubes disposed between the first and second heat exchange tubes such that the first, second and one or more heat exchange tubes arranged vertically to align the first linear segments of the first, second and one or more heat exchange tubes in a first plane and to align the second linear segments of the first, second and one or more heat exchange tubes in a second plane, where the first plane is offset laterally from the second plane;
where the first tube assembly is stacked atop the second tube assembly to align the first plane of the first tube assembly with the first plane of the second assembly and to align the second plane of the first tube assembly with the second plane of the second tube assembly.

34. The heat exchanger of claim 33, further comprising:
a plurality of gas burners for delivering combustion gases through each of the heat exchange tubes of the first tube assembly and the second tube assembly.

35. In a convection oven including a baking chamber, a door providing access to the baking chamber, and a blower for circulating air along an air flow path through the baking chamber, a heat exchanger comprising:
a plurality of heat exchange tubes extending across a portion of the air flow path outside the baking chamber, each heat exchange tube including an input end and an output end;
a plurality of in-shot burners, each in-shot burner aligned for firing a flame into a respective one of the input ends;
a burner housing positioned about the in shot-burners and configured to increase air velocity along a length of each in-shot burner for reducing candling at gas orifices that provide gas to the in-shot burners.

36. The heat exchanger of claim 35 wherein the plurality of gas burners are fed by a single gas manifold that feeds the gas orifices.

37. The heat exchanger of claim 35 wherein each in-shot burner includes an input side and an output side, the burner housing includes substantially closed and opposed side walls, a flame outlet wall and an air inlet wall, the flame outlet wall including a plurality of apertures each aligned with a respective burner output side and the respective one of the heat exchange tube input ends, the air inlet wall including a plurality of apertures each aligned with a respective burner input side.

38. A heat exchanger comprising:
at least one heat exchange tube extending across a portion of an air flow path, the heat exchange tube including an input end;
an in-shot burner has an input side and an output side, the output side aligned for firing a flame into the input end of the heat exchange tube;
a gas source including an orifice aligned to deliver gas to the input side of the burner;
at least one blower positioned for drawing air and combustion gases through the heat exchange tube;
a burner housing positioned about the in shot-burner and configured to increase air velocity along a length of the in-shot burner from the input side to the output side so as to reduce candling at the gas orifice when the in-shot burner is turned off.

39. The heat exchanger of claim 38 comprising a plurality of heat exchange tubes, a corresponding plurality of in-shot burners, and the gas source including a corresponding plurality of orifices, where the burner housing is positioned about each of the plurality of burners.

40. The heat exchanger of claim 38 wherein the burner housing includes an air intake aperture at one side and a flame outlet aperture at another side, the air intake apertures and the flame outlet aperture aligning to create an axial air flow path along the length of the burner.

41. A convection oven including:
the heat exchanger of claim 38;
a baking chamber, a door providing access to the baking chamber, and a blower for circulating air along the air flow path, where the air flow path extends in part through the baking chamber and the portion of the air flow path including the heat exchange tube is located outside the baking chamber.

42. In a convection oven including a baking chamber, a door providing access to the baking chamber, and a blower for circulating hot air along a heated air flow path that passes through the baking chamber, a heat exchanger comprising:
a plurality of heat exchange tubes extending across a portion of the heated air flow path outside the baking chamber, each heat exchange tube including an input end associated with a first linear segment, an output end associated with a second linear segment and a bend connecting the first linear segment to the second linear segment such that the second linear segment extends substantially parallel to the first linear segment, the plurality of heat exchange tubes arranged vertically to align the first linear segments in a first substantially vertical plane and to align the second linear segments in a second substantially vertical plane, where the first substantially vertical plane is offset laterally from the second substantially vertical plane;

a plurality of gas burners, each burner associated with a respective input end of a respective heat exchange tube for delivering combustion gases through the respective heat exchange tube; and a substantially vertically extending baffle member positioned between the heat exchange tube first segments in the first substantially vertical plane and the heat exchange tube second segments in the second substantially vertical plane, the baffle member increasing speed of airflow proximate to the first and second tube segments.

* * * * *